US009292162B2

United States Patent
Topakas et al.

(10) Patent No.: US 9,292,162 B2
(45) Date of Patent: Mar. 22, 2016

(54) DISCOVERING AND PRESENTING DÉCOR HARMONIZED WITH A DÉCOR STYLE

(71) Applicant: ART.COM, INC., Emeryville, CA (US)

(72) Inventors: Nasos Topakas, San Ramon, CA (US); Paul Golding, Cupertino, CA (US); Garris Shipon, Berkeley, CA (US); Thanigai Vellore, San Ramon, CA (US)

(73) Assignee: ART.COM, Emeryville, CA (US)

( * ) Notice: Subject to any disclaimer, the term of this patent is extended or adjusted under 35 U.S.C. 154(b) by 149 days.

(21) Appl. No.: 14/030,913

(22) Filed: Sep. 18, 2013

(65) Prior Publication Data

US 2014/0304265 A1  Oct. 9, 2014

Related U.S. Application Data

(60) Provisional application No. 61/809,802, filed on Apr. 8, 2013, provisional application No. 61/809,832, filed on Apr. 8, 2013, provisional application No. 61/824,967, filed on May 17, 2013.

(51) Int. Cl.
*G06F 7/00* (2006.01)
*G06F 17/30* (2006.01)
*G06F 3/0481* (2013.01)
(Continued)

(52) U.S. Cl.
CPC ...... *G06F 3/04815* (2013.01); *G06F 17/30247* (2013.01); *G06F 17/30265* (2013.01); *G06Q 30/0631* (2013.01); *G06Q 50/10* (2013.01)

(58) Field of Classification Search
CPC ............ G06F 3/04842; G06F 3/04882; G06F 3/0484; G06F 3/0481; H04L 63/08

USPC .......................................................... 707/737
See application file for complete search history.

(56) References Cited

U.S. PATENT DOCUMENTS 2,291,257 A * 7/1942 Rider ............................. 434/79
5,743,407 A * 4/1998 Williams .................. G09F 5/04
                                                        206/459.5

(Continued)

OTHER PUBLICATIONS

U.S. Appl. No. 14/030,931 of Topakas, N., et al. filed Sep. 18, 2013.

(Continued)

*Primary Examiner* — Hosain Alam
*Assistant Examiner* — Nicholas Allen
(74) *Attorney, Agent, or Firm* — Perkins Coie LLP

(57) ABSTRACT

Technology is disclosed for discovering décor harmonized with a décor style ("the technology"). The décor includes décor items, e.g. artworks, paintings, pictures, artifacts, architectural pieces, arrangement of artworks, color selection, room décor, rugs, mats, furnishings, household items, fashion, clothes, jewelry, car interiors, garden arrangements etc. The technology facilitates analyzing user input to identify a décor style from a décor style dictionary, obtaining décor that harmonizes with décor style, and presenting a representation of the décor to the user. The décor style dictionary includes décor styles that are generated based on an analysis of content, including images and description of décor, from a plurality of sources. The décor styles can be based on a number of concepts, including a theme of the décor, a color/color palette, a mood of the person, a fashion era, a type of architecture, etc. The technology facilitates presentation of discovered décor using computer generated imagery techniques.

31 Claims, 16 Drawing Sheets

(51) Int. Cl.
*G06Q 30/06* (2012.01)
*G06Q 50/10* (2012.01)

(56) References Cited

U.S. PATENT DOCUMENTS

| | | | | |
|---|---|---|---|---|
| 6,572,377 | B2* | 6/2003 | Masters | 434/72 |
| 7,661,958 | B2* | 2/2010 | Meyer et al. | 434/72 |
| 8,593,478 | B2* | 11/2013 | O'Brien-Strain | H04N 1/644 345/589 |
| 2002/0116365 | A1* | 8/2002 | Kusin | 707/1 |
| 2003/0200131 | A1* | 10/2003 | Gabbert | 705/10 |
| 2006/0085277 | A1* | 4/2006 | Arnston | 705/26 |
| 2007/0111178 | A1* | 5/2007 | Riley | 434/344 |
| 2008/0228599 | A1* | 9/2008 | Webb | G06Q 30/0603 705/26.41 |
| 2011/0029401 | A1* | 2/2011 | Granger | G06Q 30/00 705/26.4 |
| 2011/0093361 | A1* | 4/2011 | Morales | 705/26.62 |
| 2012/0224768 | A1* | 9/2012 | Lee | 382/165 |
| 2012/0231424 | A1* | 9/2012 | Calman et al. | 434/72 |
| 2012/0297325 | A1* | 11/2012 | Ball et al. | 715/764 |
| 2013/0073420 | A1* | 3/2013 | Kumm et al. | 705/26.5 |
| 2014/0289069 | A1* | 9/2014 | Bhardwaj et al. | 705/26.7 |
| 2014/0304660 | A1 | 10/2014 | Topakas et al. | |
| 2014/0304661 | A1 | 10/2014 | Topakas et al. | |

OTHER PUBLICATIONS

U.S. Appl. No. 14/030,967 of Topakas, N., et al. filed Sep. 18, 2013.

* cited by examiner

DISCOVERING AND PRESENTING DÉCOR HARMONIZED WITH A DÉCOR STYLE

CROSS-REFERENCE TO RELATED APPLICATION(S)

This application claims the benefit of U.S. Provisional Application Ser. Nos. 61/809,802 titled "DIGITAL ART SYSTEMS AND METHODS" filed Apr. 8, 2013; 61/809,832 titled "DISCOVERING, VISUALIZING AND FACILITATING THE SELECTION OF ART, DESIGN, AND DECOR" filed Apr. 8, 2013; and 61/824,967 titled "DISCOVERING, VISUALIZING AND FACILITATING THE SELECTION OF ART, DESIGN, AND DECOR" filed May 17, 2013, all of which are incorporated herein by reference for all purposes in their entirety.

TECHNICAL FIELD

The disclosure relates to online tools for discovering décor, and more specifically to discovering and presenting décor that is harmonized with a décor style.

BACKGROUND

Current tools for finding décor items such as art, rugs, decorating paint, furnishings, fashion etc. are typically naïve. They do not address the problem of finding different décor items that match or harmonize to a particular required style. The current tools lack abilities to select décor items with visually common features, such as color or style. The current tools lack abilities to search across the Web for décor items based on décor attributes, such as color, the mood of a person, etc. Further, the décor styles are expressed by various users in various ways. For example, there are number of colors called "Green," the style "minimal" may mean differently to different users. The current tools typically lack abilities to co-ordinate these different ways of expressing a décor style to find harmonized décor items.

SUMMARY

Technology is disclosed for discovering décor that is harmonized with a décor style ("the technology"). The décor can include one or more of a variety of décor items such as artworks, paintings, pictures, artifacts, architectural pieces, arrangement of artworks, color selection, décor of a room, rugs, mats, furnishings, clothes, jewelry, fashion, car interiors, flower arrangements, gardens, etc. In various embodiments, the décor styles are defined based on a number of concepts including a theme of the décor such as "minimal," "abstract," "calm"; a mood of the person such as "happy," "party," "romantic"; a type of architecture such as "traditional" "contemporary," "Victorian"; color themes such as "Moroccan," "Greece" etc.

The technology facilitates analyzing a user input to determine a décor style specified by the user, identifying a décor style classifier from a system generated décor style classifier dictionary containing a number of décor styles that can be used by a décor discovery system for discovering décor, determining various décor based on the décor style classifier, and presenting a representation of the determined décor to the user using a variety of presentation techniques.

A particular décor style is characterized by style data which can include keywords or phrases that are indicative or descriptive of the particular style; sample images of the décor that match the particular style; and features of the décor items that are indicative of the particular style, which can include features such as a number of décor items in the room, placement of the décor items, color pattern of the room, color of the décor items, design of the décor items (e.g. form, shape, materials) etc. In various embodiments such features of the décor style can be gathered using morphological analysis techniques on an image representative of a décor of the particular décor style. One method of generating such style data is by crawling the World Wide Web and obtaining the data from websites, blogs, articles etc. discussing interior decoration, art, décor, etc. The style data can also be obtained from a number of other sources such as online magazines, documents that discuss fashion, interior decoration, art, décor, preferences and tastes of various users etc.

In some embodiments, the style data for a particular décor style may be defined by the user. The user can be an end user who consumes or is seeking recommendations regarding décor items, an expert (in décor) such as an architect, an interior designer, a photo stylist, or a clothing designer. The décor discovery system can also track trends in taste and décor style by tracking data associated with influential sources (e.g. fashion designers) in the décor industry. The décor discovery system creates, manages and updates the décor style dictionary with the style data obtained using the above methods.

In various embodiments, the décor discovery system tracks user preferences for a particular décor style based on the various décor items chosen by the user and uses the style data associated with user preference to update the décor style dictionary as necessary.

In various embodiments, the décor discovery system facilitates automatic generation of color palettes based on a number of décor styles such as a mood of a person, travel theme, fashion era etc. The suggested color palettes may be then used, for example, in creation of art, selection of art that matches with the décor of a room, selection of a new décor for the room, etc.

In various embodiments, the décor discovery system may discover décor based on a décor style data input by the user. The user may specify the required décor style in the form of keywords and/or images. The keywords can be indicative of style names, features or attributes, color pattern etc. of the décor items. The image can be of one or more of décor items. For example, the user may upload a picture of an existing room to the décor discovery system and discover décor, e.g. decor items that are harmonized with the décor of the room.

In various embodiments, the décor discovery system facilitates presentation of the discovered décor using various presentation techniques such as three dimensional (3D) computer generated imagery (CGI) modeling. The user may view the discovered décor, for example, décor of a room or arrangement of a garden generated using 3D CGI techniques.

DETAILED DESCRIPTION

Figure 1:
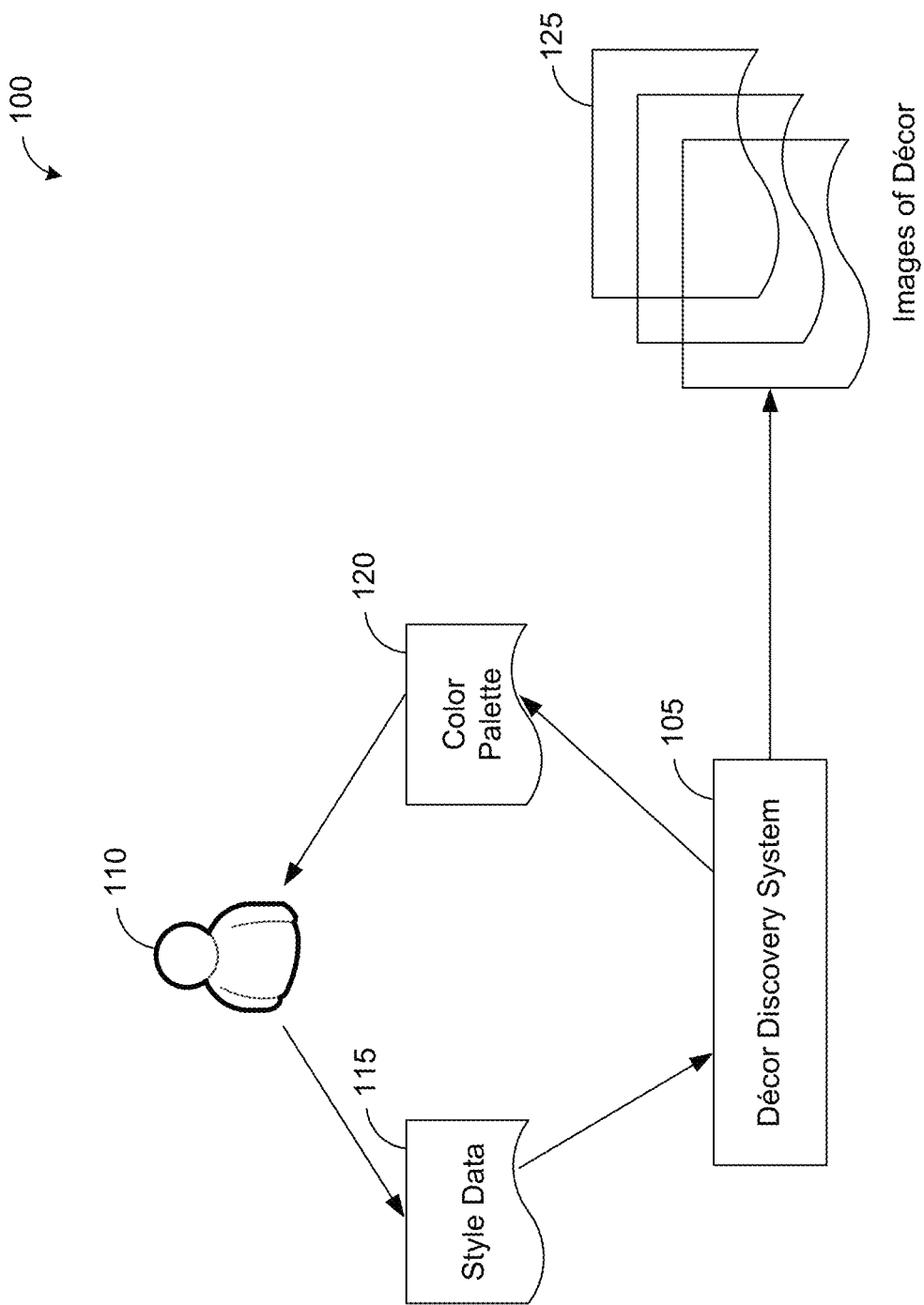
FIG. 1 is a block diagram illustrating an environment in which the technology can operate in various embodiments.

Technology is disclosed for discovering décor that is harmonized with a décor style ("the technology"). The décor can include one or more of a variety of décor items such as artworks, paintings, pictures, artifacts, architectural pieces, audio (e.g. music), arrangement of artworks, color selection, décor of a room, rugs, mats, furnishings, clothes, jewelry, fashion, car interiors, flower arrangements, gardens, etc. In various embodiments, the décor styles are defined based on a number of concepts including a theme of the décor such as "minimal," "abstract," "calm"; a mood of the person such as "happy," "party," "romantic"; a type of architecture such as "traditional" "contemporary," "Victorian"; color themes such as "Moroccan," "Greece" etc.

The technology facilitates analyzing a user input to determine a décor style specified by the user, identifying a décor style classifier from a system generated décor style classifier dictionary containing a number of décor styles that can be used by a décor discovery system for discovering décor, determining various décor based on the décor style classifier, and presenting a representation of the determined décor to the user using a variety of presentation techniques.

A particular décor style is characterized by style data which can include keywords or phrases that are indicative or descriptive of the particular style; sample images of the décor that match the particular style; and features of the décor items that are indicative of the particular style, which can include features such as a number of décor items in the room, placement of the décor items, color pattern of the room, color of the décor items, design of the décor items (e.g. their form, shape, materials) etc. In various embodiments such features of the décor style can be gathered using morphological analysis techniques on an image representative of a décor of the particular décor style. One method of generating such style data is by crawling the World Wide Web and obtaining the data from websites, blogs, articles etc. discussing interior decoration, art, décor, etc. The style data can also be obtained from a number of other sources such as online magazines, documents that discuss fashion, interior decoration, art, décor, preferences and tastes of various users etc.

In some embodiments, the style data for a particular décor style may be defined by the user. The user can be an end user who consumes or is seeking recommendations regarding décor items, an expert (in décor) such as an architect, an interior designer, a photo stylist, or a jewelry designer. The décor discovery system can also track trends in taste and décor style by tracking data associated with influential sources in the décor industry. The décor discovery system creates, manages and updates the décor style dictionary with the style data obtained using the above methods.

In various embodiments, the décor discovery system tracks user preferences for a particular décor style based on the various décor items chosen by the user and uses the style data associated with user preference to update the décor style dictionary as necessary.

In various embodiments, the décor discovery system facilitates automatic generation of color palettes based on a number of décor styles such as a mood of a person, travel theme, fashion era etc. The suggested color palettes may be then used, for example, in creation of art, selection of art that matches with the décor of a room, selection of a new décor for the room, etc.

In various embodiments, the décor discovery system may discover décor based on a décor style data input by the user. The user may specify the required décor style in the form of keywords and/or images. The keywords can be indicative of style names, features or attributes, color pattern etc. of the décor items. The image can be of one or more of décor items. For example, the user may upload a picture of an existing room to the décor discovery system and discover décor, e.g. décor items that are harmonized with the décor of the room.

In various embodiments, the décor discovery system facilitates presentation of the discovered décor using various presentation techniques such as three dimensional (3D) computer generated imagery (CGI) modeling. The user may view the discovered décor, for example, décor of a room or arrangement of a garden generated using 3D CGI techniques. The above mentioned embodiments and other embodiments of the technology are described below with reference to FIGS. 1-14.

Environment for Décor Discovery

Turning now to FIG. 1, FIG. 1 is a block diagram illustrating an environment 100 in which the technology can operate in various embodiments. The décor discovery system 105 facilitates a user 110 to discover décor, such as the décor items mentioned above, based on the style data 115 input by the user 110. The décor discovery system 105 analyzes the style data 115 to determine a particular décor style classifier in a décor style dictionary (not illustrated) that defines a décor style corresponding to the style data 115. The décor discovery system 105 retrieves images of a number of décor items 125 based on the particular décor style classifier and presents the images of décor items 125 to the user 110. In some embodiments, the décor discovery system 105 can combine various décor items into one harmonized décor and present the harmonized décor to the user. For example, the décor discovery system 105 can determine various décor items of a room based on a particular décor style, combine the determined décor items to form a harmonized room décor, and present the harmonized room décor to the user.

In some embodiments, the user 110 may want to view décor items of the particular décor style having a certain combination of colors. The décor discovery system 105 generates a number of color palettes 120 based on the particular décor style classifier. The user 110 may choose one of the color palettes 120 and view only those décor items having color combinations similar to the chosen color palette 120.

In various embodiments, the style data 115 input by the user can include data such as "minimal," "abstract," "calm," "Zen-like" indicating a theme of the décor; "happy," "party," "romantic" indicating a mood of the person; "traditional" "contemporary," "Victorian" indicating a type of architecture; "Moroccan," "Greece" indicating color themes etc. In various embodiments, the style data 115 can be input by the user 110 in the form of free text, an image depicting a particular décor style, a user selection of predefined styles, or a combination of the foregoing.

In various embodiments, the accuracy of recommendation of various décor items by the décor discovery system 105 depends on a definition a particular décor style classifier to include an extensive set of features the users may associate with a décor style represented by the particular décor style classifier, and a proper identification of a particular décor style classifier from the décor style dictionary based on the user input. The creation of décor style classifiers and the décor style dictionary are described in further detail with reference to at least FIGS. 2-5.

Décor Style Dictionary

Figure 2:
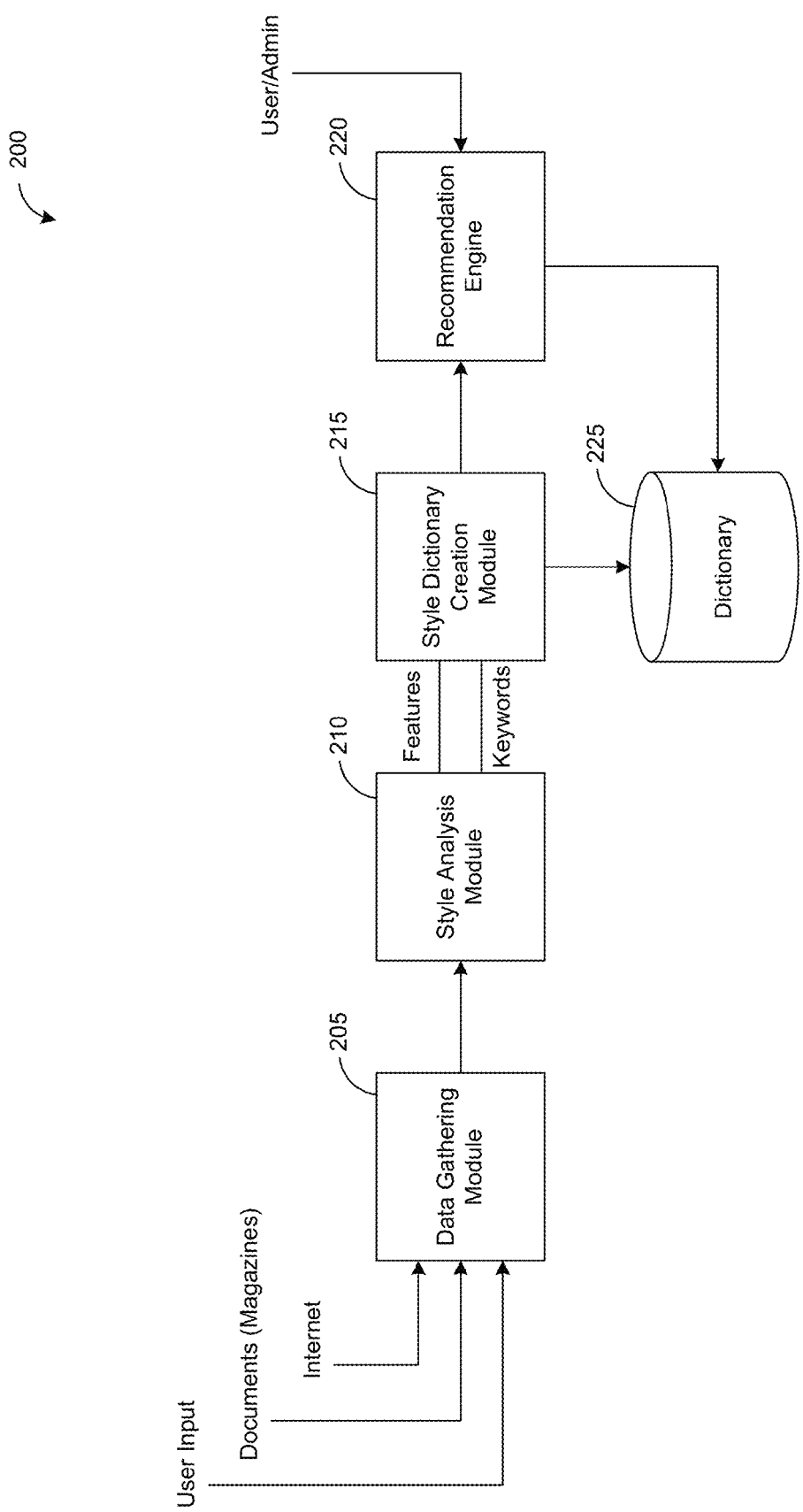
FIG. 2 is a block diagram illustrating a system to create a dictionary of décor styles, consistent with various embodiments.
Figure 3:
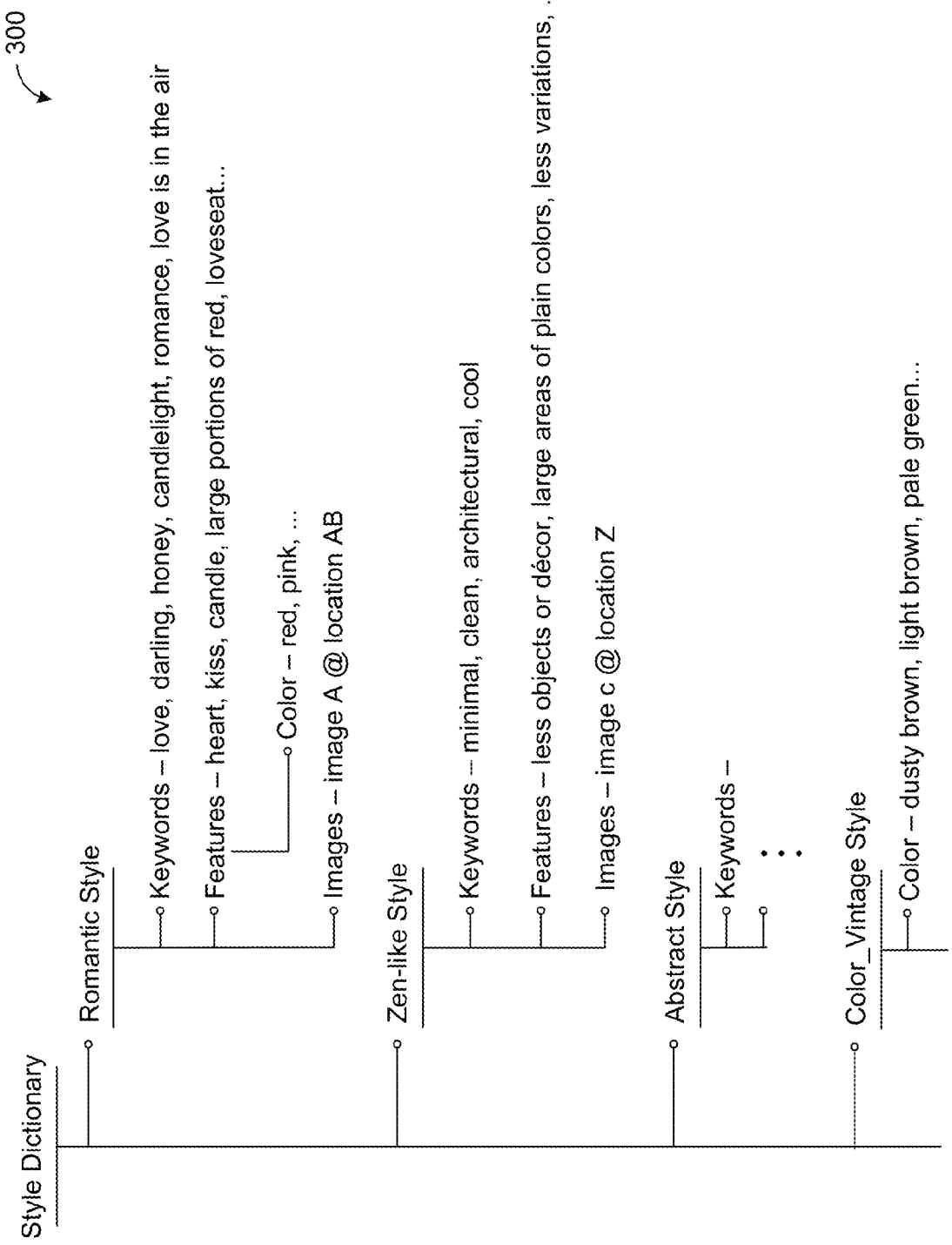
FIG. 3 is an example implementation of a décor style dictionary, consistent with various embodiments.

Turning now to FIG. 2, FIG. 2 is a block diagram illustrating a system 200 to create a dictionary of décor styles, consistent with various embodiments. In various embodiments, the system 200 may be implemented in the environment 100 of FIG. 1. The system 200 can be used to define various décor styles and organize them as corresponding décor style classifiers in a décor style dictionary 225. The décor style dictionary 225 may be stored in computer readable medium according to any suitable storage mechanism such as well known database storage techniques. An example implementation of a décor style dictionary created using system 200 is illustrated in FIG. 3.

The example implementation 300 of the décor style dictionary includes décor style classifiers such as "Romantic Style," "Zen-like Style," "Abstract." Each of these décor style classifiers describe a particular décor style. The factors that can contribute to defining, identifying, or describing the particular décor style is included in the signature of the particular décor style classifier. For example, when a user says he/she wants the décor of the room to be "romantic," he/she may mean that room has to have vases with red roses, a love seat, a light colored wall, a number of paintings with subject as romance or love. Similarly, for another user "romantic" style may mean that the room has to have flower themed chandeliers, large areas of pink color, smooth satin sheets, cushions with heart designs on them, etc. Accordingly, the décor style classifier "Romantic Style" is defined using an extensive set of features that the users may associate the style with. As illustrated in the example implementation 300 of the décor style dictionary, the signature of décor style classifier "Romantic Style" can include (a) keywords such as "love", "darling," "honey" etc.; (b) décor features (representation of décor items) such as "heart," "kiss," "candle," "large portions of red," "loveseat"; (c) preferred colors such as "red", "pink" etc. and (d) location of images that correspond to the "Romantic Style" and other information associated with each of the images, such as colors in an image, features of the image, keywords indicative of the features of the image etc.

The other décor style classifiers "Zen-like Style" and "Abstract" may be defined similarly. Further, in various embodiments, the décor style classifiers may also include information regarding features that are not preferred by the users for a particular décor style. For example, some users may not consider a color such as bright green to be romantic. Some users may not want to have a television in a romantic style room. The information regarding non-preferred features may be included in the décor style classifiers in various ways. For example, the definition of décor style classifiers can have non-preferred data as "exclusions." In another example, each of the keywords or features of the definition may be associated with a weight that indicates a degree of match of a keyword or feature with a décor style corresponding to the particular décor style classifier. The décor discovery system 100 ensures that the décor items having excluded features or features that have a weight below a particular threshold are excluded from the recommendation. In various embodiments, the definition of the décor style classifiers may be updated continuously to reflect a change in user preferences.

In some embodiments, a color or color palette could be a separate décor style classifier. For example, the décor style classifier "Color_Vintage Style" can describe the colors that match with "vintage" style as perceived by the users.

Referring back to FIG. 2, the system 200 includes a data gathering module 205 that gathers style data from various sources that can be used to define various décor style classifiers. The data gathering module 205 analyzes various sources to identify and extract any information that is relevant to or associated with décor. The information can include, for example, descriptions, discussions, or images associated with or relevant to décor such as artworks, paintings, pictures, artifacts, architectural pieces, arrangement of artworks, color selection, décor of a room, rugs, mats, furnishings, clothes etc. The information can further include descriptions, discussions, or images associated with or relevant to a style of décor, including a theme of the décor, a mood of the person, a type of architecture, color themes etc.

In various embodiments, the data gathering module 205 gathers the above style data in the form of (a) keywords or phrases describing or associated with the décor style, (b) features associated with the décor style, (c) images that correspond to various décor styles, (d) metadata of the images, and (e) location of the images. Examples of keywords describing theme based décor style can include "minimal," "abstract," "calm," "color trends for 2013"; mood based décor style can include "happy," "party," "romantic"; architecture type based décor style can include "traditional," "contemporary," "Victorian"; culture based décor style can include "Moroccan," "Greece," "Middle Eastern" etc. Examples of features gathered include color patterns of a décor style, features of objects in the décor, arrangement of objects in the décor etc. In various embodiments, the data gathering module 205 can use image analysis techniques such as morphological analysis to gather features from the images of various décor items.

The sources from which the data gathering module 205 obtains the above information can include websites, blogs, journals, documents, magazines that are relevant to décor. In some embodiments, a user too can provide information regarding décor style to the data gathering module 205.

The style analysis module 210 analyzes the information extracted by the data gathering module 205 to identify different décor styles, and associate the keywords, phrases, features, images with their corresponding décor styles. For example, from the information extracted, the style analysis module 210 may recognize "romantic" as one of the styles. The style analysis module 210 analyzes the extracted information to identify the keywords, phrases, features, images with "romantic" décor style. The style analysis module 210 may identify keywords or phrases such as "roses," "love," "love is in the air," "honey," "darling," etc. associated with the "romantic" décor style. The style analysis module 210 may identify features such as vases with red roses, a love seat, a light colored wall, a number of paintings with subject as romance or love, flower themed chandeliers, large areas of pink color, smooth satin sheets, and cushions with heart designs on them from the sampled images as associated with "romantic" style. The style analysis module 210 may also analyze metadata associated with sampled images to obtain any information, including keywords indicative of the features of the image, that may be used to identify the particular décor style.

Further, in various embodiments, the style analysis module 210 may also combine two similar décor styles into one décor style before passing the analyzed information to the style dictionary creation module 215. For example, the style analysis module 210 may combine a particular décor style referred to as "love" style by some of the sources with a particular décor style referred to as "passion" or "fantasy" styles by another source into one combined style "romance." In various embodiments, the keywords, features and images corresponding to the separate décor styles are also combined into the "romance" style. In some embodiments, the style analysis module 210 may decide to combine various styles into one based on a meaning of keywords of the décor styles being semantically same.

The style dictionary creation module 215 obtains the analyzed information, including décor style and associated keywords, features and images, from the style analysis module 210, and creates a décor style classifier representing the décor style in the décor style dictionary 225. An example of the décor style classifier created by the style dictionary creation module 215 can include a décor style classifier such as the "Romantic Style" illustrated in example implementation 300. After creating the décor style classifier, the style dictionary creation module 215 may also store the location of the images corresponding to the décor style in association with the décor style classifier, as illustrated in the example implementation 300. In various embodiments, the décor style classifier can include, for each of the images associated with the decor style classifier, various details of the image such as colors in the image, keywords associated with image, features of the image etc. This information may be useful for creating a variety of indices for the images that enables fast retrieval based on various search criteria.

In various embodiments, the style dictionary creation module 215 can also identify other keywords, features and images that can be associated with a particular decor style classifier. One example of such an identification method can include identifying keywords that are semantically same as the keywords associated the particular décor style classifier. The style dictionary creation module 215 can identify such keywords from the set of keywords associated with other décor style classifiers in the décor style dictionary 225 or can obtain the keywords from a number of other sources such as Internet, English dictionaries, décor magazines etc.

In various embodiments, the décor style dictionary 225 serves as a lookup service for identifying a particular décor style classifier based on the user input of décor style. The particular décor style classifier is then used for generating décor recommendations. The style dictionary creation module 215 implements the décor style dictionary 225 using a suitable data structure. In various embodiments, the data structure may be implemented such that it supports fast and efficient searching and retrieval of the décor style classifiers based on the user input. In various embodiments, the style dictionary creation module 215 may index and/or cluster the keywords, features, images based on the décor styles they are associated with.

The system 200 includes a recommendation engine 220 that is used to facilitate recommendation of décor items to the user. The recommendation engine 220 can be used in various ways. For example, the recommendation engine 220 can be used to search various décor items from various sources and analyze them to determine whether they match with the style data 115 input by the user. The recommendation engine 220 may also be used to analyze the user input, including style data 115, to identify a particular décor style classifier from the décor style dictionary. Further, the recommendation engine 220 may also be used to improve the accuracy of definitions of the decor style classifiers in the décor style dictionary 225. In various embodiments, the recommendation engine 220 can be implemented using a rule-based expert system (hereinafter simply "expert system"), a clustering engine, or various other self-learning techniques that can classify, group, categorize or associate different data based on a certain criteria. In the context of the disclosed technology, the recommendation engine 220 can be used to classify, group, categorize or associate images and keywords representing various décors of various décor styles into specific décor styles.

Consider an example where the recommendation engine 220 is implemented as an expert system. The expert system can include an inference engine (not illustrated) that facilitates in making decisions on recommendation of décor items based on the rules (e.g. décor style definition) defined in a knowledge base (not illustrated). At work, the inference engine reasons about the knowledge base like a human. In various embodiments, the décor style dictionary 225 may form the knowledge base of the expert system. Further, the definitions of the décor style classifiers may be expressed as rules. In various embodiments, the rules are expressed with natural language such as "IF . . . THEN . . . ." However, the rules may be formulated in various other ways and may be adapted to a particular inference engine style.

Every rule has an IF part, also called the antecedent and a THEN part, also called the consequent part. These rules must link the evidence about the problem under consideration to the conclusion. For example:

"IF it is love THEN it is romance"
"IF style=romance THEN color in décor item≠bright green"
"IF the number of décor items in the image is not known with certainty AND the color pattern includes large portions of pink AND the morphological features indicate décor items with heart design AND the sheets on the bed is satin and red THEN there is a strong probability (0.8) that the style is of type Romance"

The inference engine is designed to produce reasoning on rules. In order to produce reasoning, it should be based on logic. There are several kinds of logic, including propositional logic, predicates of order 1 or more, epistemic logic, modal logic, temporal logic, fuzzy logic, probabilistic logic, etc. Propositional logic is the basic human logic that is expressed in syllogisms. With logic, the inference engine is able to generate new information from the knowledge contained in the knowledge base and data to be processed. That is, in the example where the expert system is used to facilitate recommendation of décor items, the expert system will be able analyze various décor items (e.g. images and/or keywords representing the décor items) and classify them, as per the rules, into appropriate décor styles based on the features and/or keywords associated with the décor items. The expert system can then make improved, informed and more accurate recommendations of decor items.

Referring back to the recommendation engine 220, consider an example where it is implemented as a clustering engine. The clustering engine can analyze various décor items (e.g. images and/or keywords representing the décor items) and create a number of clusters based on the features and/or keywords associated with the décor items such that images having similar features or keywords indicative of similar décor style are grouped into a cluster. The cluster represents a particular décor style. In some embodiments, separate clusters may be formed for features and keywords. Each of the clusters can then be associated with a particular décor style classifier. Such clustering techniques can be used to classify décor items into appropriate décor styles based on the features and/or keywords associated with the décor items and then, make improved, informed and more accurate recommendations of decor items.

Further, in various embodiments, the recommendation engine 220 can track the user input including style data 115, a list of décors 115 recommended by the décor discovery system 105 and the décors chosen or not chosen by the users for the particular style data 115. Accordingly, the recommendation engine 220 may track the user preferences and determine whether a definition of the décor style classifier can be improved to better match with user's perception of the décor style it represents. The recommendation engine 220 may suggest the style creation dictionary module 215 to update the definition of the particular décor style classifier accordingly. For example, the recommendation engine 220 may suggest updating the definition of a décor style classifier by adding, modifying or removing keywords, features or images associated with it. Alternatively or additionally, a user such as an expert in the décor field may manually train (e.g. add, modify or delete the rules) the recommendation engine 220 to improve the accuracy.

In various embodiments, the recommendation engine 220 may also be designed to assign a weight (also referred to as a "style probability") to the keywords, features or images associated with a décor style classifier. The weight indicates a degree of a match between the keywords, features or images and the corresponding décor style classifier. The recommendation engine 220 may adjust (e.g. increase or decrease) the weight of the keywords, features or images corresponding to the décor style classifier based on the user selection of decors of the décor style to which the décor style classifier corresponds. For example, if a user selects a particular décor from a plurality of decors of a décor style to which the décor style classifier corresponds, the expert system may increase the weight of the keywords and/or features related to the particular décor in the signature of the décor style classifier. The increase in weight indicates an increase in the degree of match between the keywords and/or features and the décor style to which the décor style classifier corresponds.

Figure 4:
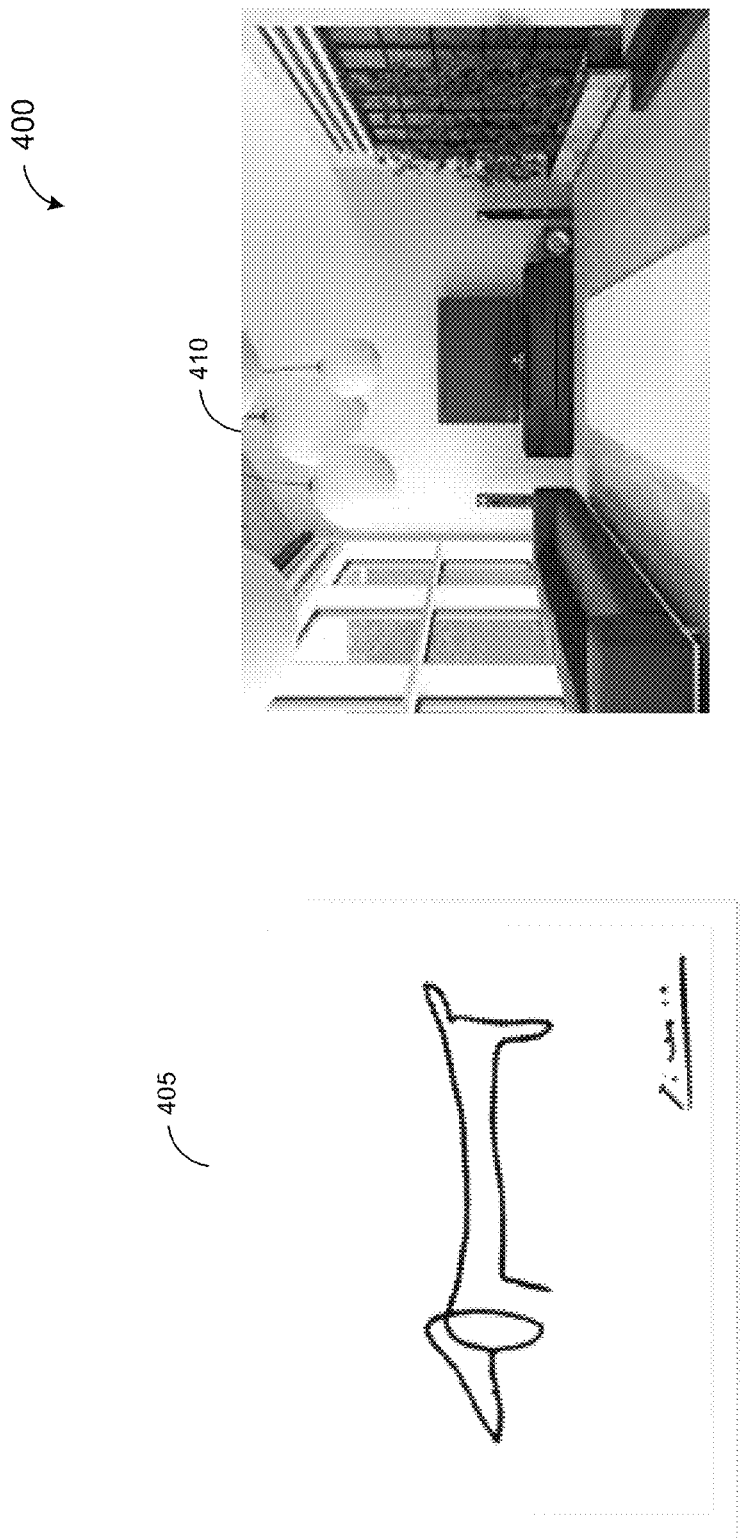
FIG. 4 is an example of images of various décor styles, consistent with various embodiments.

FIG. 4 is an example 400 of images of various décor styles, consistent with various embodiments. An image 405 can be artwork such as a picture or a painting. An image 410 can be a picture of a décor of a room. In various embodiments, the image can be of other décor items such as a product in a catalogue—e.g. sofa, necklace or hat. In the example 400, the images 405 and 410 are considered to be of different styles by different users. For example, while a first user may consider the images 405 and 410 to be of "Minimal" and "Eclectic" décor styles, respectively, a second user may consider them to be of "Clean" and "Busy" décor styles, respectively, and a third user may consider them to be of "Architectural" and "Organic" décor styles, respectively.

A system such as system 200 can analyze the images 405 and 410 and associate them with particular décor style classifiers. In some embodiments, the system 200 may analyze the keywords describing the décor styles, features of the images, the color pattern in the images, décor items in the images etc. to determine the décor style classifier they have to be associated with. In one example, the system 200 may determine to associate the image 405 with a décor style classifier, for example, a "Zen-like" décor style as illustrated in décor style dictionary 300, that has keywords semantically similar to that of "Minimal," "Clean" and "Architectural". The system 200 may also associate the foregoing keywords with the décor style classifier "Zen-like". Additionally or alternatively, the system 200 may associate the image 405 with another décor style classifier that has features (e.g. morphological features), color pattern etc. similar to that of the image 405. For example, if an image has areas that lack "patterns" and are linear-edged, uniformly shaped, symmetrical (etc.), then the image might be classified as "Minimal" if such a morphology is often seen in décor of "Minimal" style décor.

In some embodiments, the system 200 may associate the image 405 with a style probability indicating a probability of the image 405 being of a particular décor style. The system 200 analyzes and associate the image 410 with one or more décor style classifiers similarly. Further, in some embodiments, the system 200 also assigns weight to the keywords and features of the images 405 and 410 indicating a degree of match of the keywords or features to the décor style represented by the décor style classifier.

Figure 5:
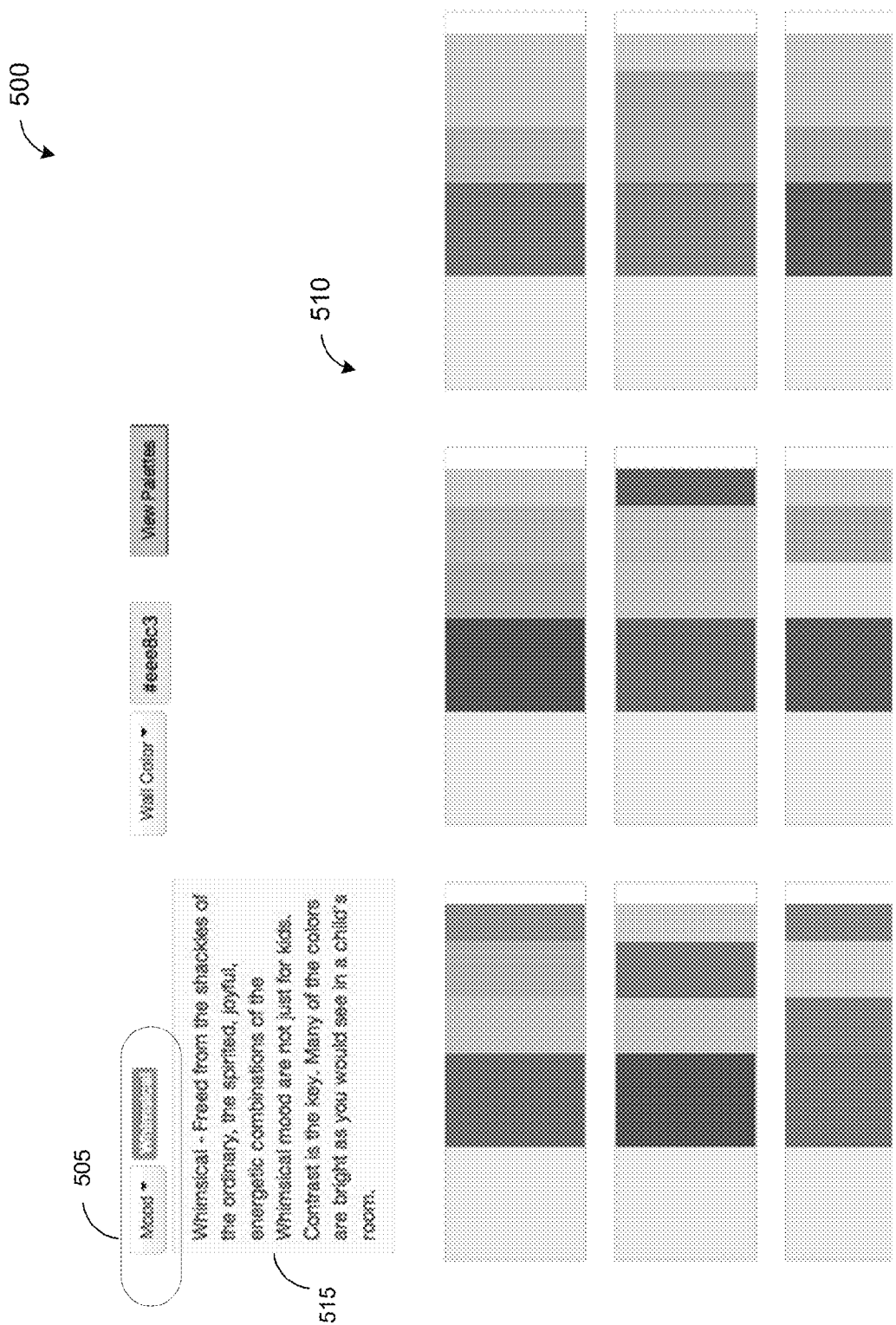
FIG. 5 is an example of a tool for generating a color palette based on décor style, consistent with various embodiments.

FIG. 5 is an example of a tool 500 for generating a color palette based on décor style, consistent with various embodiments. The tool 500 can be used to generate a color palette 510 based on décor style 505 input by the user. The user can choose a palette from the color palette 510 and then proceed to searching for décor that corresponds with the chosen color palette and the décor style 505.

In various embodiments, the tool 500 can be implemented in a system such as system 200 of FIG. 2. The user can input various types of décor style such as décor concept, theme of the décor, mood of a person etc. The décor style 505 input by the user includes a mood of a person such as "Whimsical." The tool 500 also displays a description 515 of the mood "Whimsical." In some embodiments, the description 515 may help the user to get an understanding of what the tool 500 may interpret the mood as. Upon receiving the décor style 505 input from the user, the tool 500 identifies a décor style classifier from the décor style dictionary corresponding to the décor style 505. The tool 500 then identifies a set of colors associated with the particular décor style classifier and generates a color palette 510 with various combinations of colors from the set of colors. Further, in some embodiments, the tool 500 may arrive at particular combinations of colors in each color palette 510 based on a weight associated with each of the set of colors.

In some embodiments, the tool 500 identifies a set of colors harmonized with a one or more colors input by the user. Given a color preference (e.g. a "key color") by the user, the tool 500 can generate harmonized colors according to various algorithms (e.g. related to color theory). In some embodiments, the set of harmonized colors may not be among the colors associated with the décor style classifier in the décor style classifier dictionary. If the set of harmonized colors are not yet associated with the décor style classifier in the décor style classifier dictionary, they will be associated with the décor style classifier.

FIG. 5 illustrates the décor style 505 being input as a selection of the décor styles from a drop down list having predefined values for décor styles. However, it should be noted that the user may input décor styles in various other ways, including free text. In some embodiments, the "key" color input by the user can be a selection of a color from a predefined list of colors presented by the tool 500 or could be described by the user using product color names (e.g. from paint companies, furniture manufacturers etc.) figurative descriptions (e.g. pale yellow, sunset orange) or any type of descriptions in common use (e.g. as found on the Internet). The system 200 contains a dictionary of color names matched to various instances of color found in various sources such as product catalogues and descriptions. Given an input description for a color, the system 200 can find the nearest or closest color name belonging to a product.

In some embodiments, the user can also input a color using visual means, such as a photograph or a camera. The system 200 can determine a particular color by applying various known techniques, e.g. probabilistic logic, to guess the color name given the content of the image (e.g. if the system 200 analyzes that image is a sofa from IKEA, then it can identify the color ranges accordingly). In various embodiments, such techniques can be used to overcome the often significant limitations of smartphone cameras (e.g. color distortion).

Figure 6:
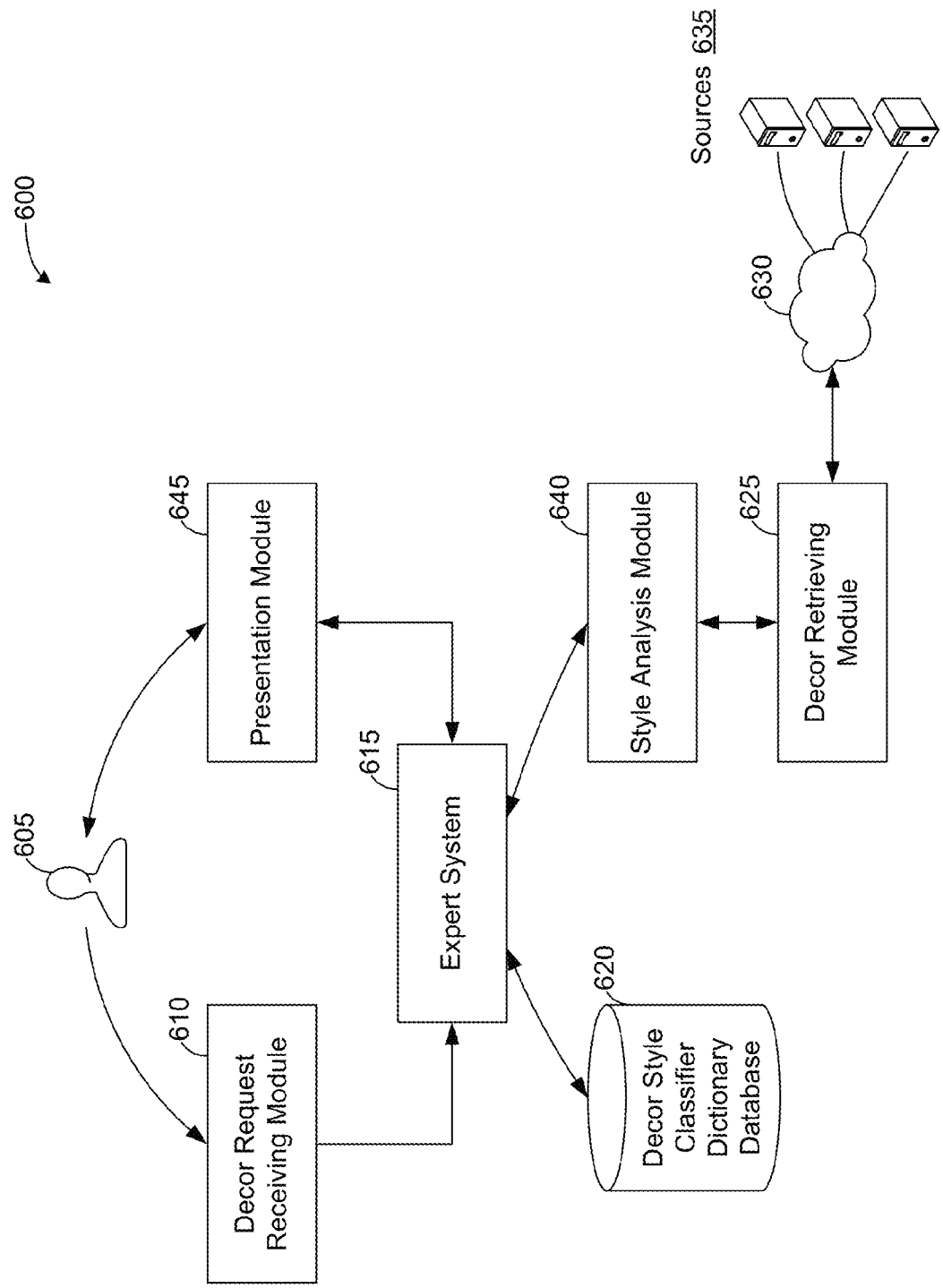
FIG. 6 is a block diagram of a process for discovering décor based on décor styles, consistent with various embodiments.

FIG. 6 is a block diagram of a system for discovering décor based on décor styles, consistent with various embodiments. The system 600 can be implemented in an environment such as environment 100 of FIG. 1. The system 600 includes a décor request receiving module 610 that receives a request to search for various décor of a particular décor style specified by a user 605. In various embodiments, the user input of the décor style could be in the form of free text, a user selection of images from a list of images representing various decors of certain décor styles presented to the user 605 by the system 600, a user selection of predefined décor styles, user input of images of décor. In some embodiments, the free text can include visual features of décor, like "zigzag" or "striped." Further, the user input can also include data specifying a type of décor. The type of decor can include one or more of a décor of a room, including furniture in the room, a color pattern of the room, clothes, artworks, household items etc.

The expert system 615 determines a number of decors that match with the particular décor style input by the user 605. In various embodiments, the expert system 615 is similar to the recommendation engine 220 of FIG. 2. In FIG. 6, although the recommendation engine is implemented using an expert system 615 other implementations of recommendation engine as described in reference with FIG. 2 are possible. The expert system 615 analyzes the user input and identifies a décor style classifier from the décor style classifier dictionary database 620 that corresponds to the particular décor style specified by the user 605.

In various embodiments, the expert system 615 determines a décor style classifier having a signature with features or keywords that match with the keywords or features of the images of the user input indicative of the particular décor style. After identifying the décor style classifier, the expert system 615 can obtain the locations of the images representing the decors corresponding to the décor style to which the décor style classifier corresponds from an index in the decor style classifier dictionary database 620 and provide them to the décor retrieving module 625. The décor retrieving module 625 retrieves the images from the corresponding locations and provides them to the presenting module 645 for presentation to the user 605.

In various embodiments, the expert system 615 can also obtain additional images of decors from a number of sources 635. The sources 635 can be accessed over a communication network 630, such as Internet, local area network (LAN), wide area network (WAN) etc. The sources 635 may or may not be similar to the sources from which the data gathering module 205 obtains the images of décor or the sources the locations of which is indexed in the décor style classifier dictionary database 620. The expert system 615 can instruct the decor retrieving module 625 to obtain images representing various decors of various décor styles from the sources 635. The style analysis module 640 extracts (a) the features and (b) keywords indicative of the features from the additional images and transmits them to the expert system 615 for further analysis. In various embodiments, the expert system 615 compares the keywords and the features of the additional images with the keywords and features of the décor style classifier corresponding to the particular décor style specified by the user 605 to determine whether the additional images are harmonized with the particular décor style.

In various embodiments, the expert system 615 can also determine whether an additional image is harmonized with the particular décor style to which the décor style classifier corresponds based on a function of the weight of the keywords or the features in the signature of the décor style classifier. For example, if the weight of the keywords or the features of décor style classifier that matched with the keywords or the features of an additional image is above a predefined threshold, then the expert system 615 may determine that the additional image is harmonized with the particular décor style. On the other hand, if the weight is below the threshold, the expert system 615 may determine that the additional image is not of the particular décor style.

Using a threshold for comparing the weight is just one example of a function of weight. In various embodiments, the expert system 615 can use various other functions of weight. For example, the expert system 615 can use a function that determines an average of the weights of all the keywords and features of the décor style classifier that match with the keywords or the features of an additional image. If the average weight exceeds a predefined threshold, then the additional image is considered to be harmonized with the particular décor style. In some embodiments, the average weight of the keywords and features of more than one décor style classifier that match with the keywords or the features of the additional image may exceed the predefined threshold. In such a case the additional image may be considered to be harmonized with more than one décor style.

The presentation module 645 presents the images of decors to the user 605. In various embodiments, the presentation module 645 can present the images of the décors using a three dimensional (3D) computer generated imagery (CGI) modeling. In various embodiments, the 3D CGI modeling generates photo realistic imagery of the décor. For example, a 3D CGI modeling of a décor such as a décor of a room generates a photo realistic imagery of the room containing various décor items. In various embodiments, the user 605 can further customize the décor of the room by adding, modifying or removing décor items from the room, and view the 3D CGI of the customized decor. Further, the user may dynamically customize the décor in the 3D CGI of the room. For example, the user 605 may change the color of a portion or the whole room, move an artwork from one position to another, or remove a couch from the room, change the geometrical data such as size of the wall that affects the overall configuration of the room, and simultaneously view the 3D CGI of the customized décor of the room.

Figure 7:
FIG. 7 is an example of presentation of an artwork in a room using three dimensional (3D) computer generated imagery (CGI) modeling, consistent with various embodiments.

FIG. 7 is an example 700 of a presentation of an artwork 705 in a room using 3D CGI modeling, consistent with various embodiments. The artwork 705 can be viewed in 3D CGI of such various rooms.

Referring back to FIG. 6, in various embodiments, the system 600 can discover various décor items that are harmonized with a décor style of a specific room input by the user 605. In various embodiments, the user 605 may upload a two dimensional (2D) image of the specific room. For example, the user 605 may include as user input to the décor request receiving module 610 an image of the décor of a room the user 605 intends to find the décor items for. The expert system 615 determines the features of the room, e.g. using on morphological analysis, finds the décor items (e.g. as explained above) and presents the décor items to the presentation module 645. The presentation module 645 can generate a 3D CGI of the room input by the user 605 with décor items discovered by the expert system 615.

In various embodiments, the system 600 can also generate descriptions such as a reason why a particular décor was chosen by the system 600. For example, an artwork can be presented with an art descriptor that includes a brief description of the artwork and/or a reason why the artwork is selected. In various embodiments, the art descriptor may help the user understand why a particular artwork was recommended.

Figure 8:
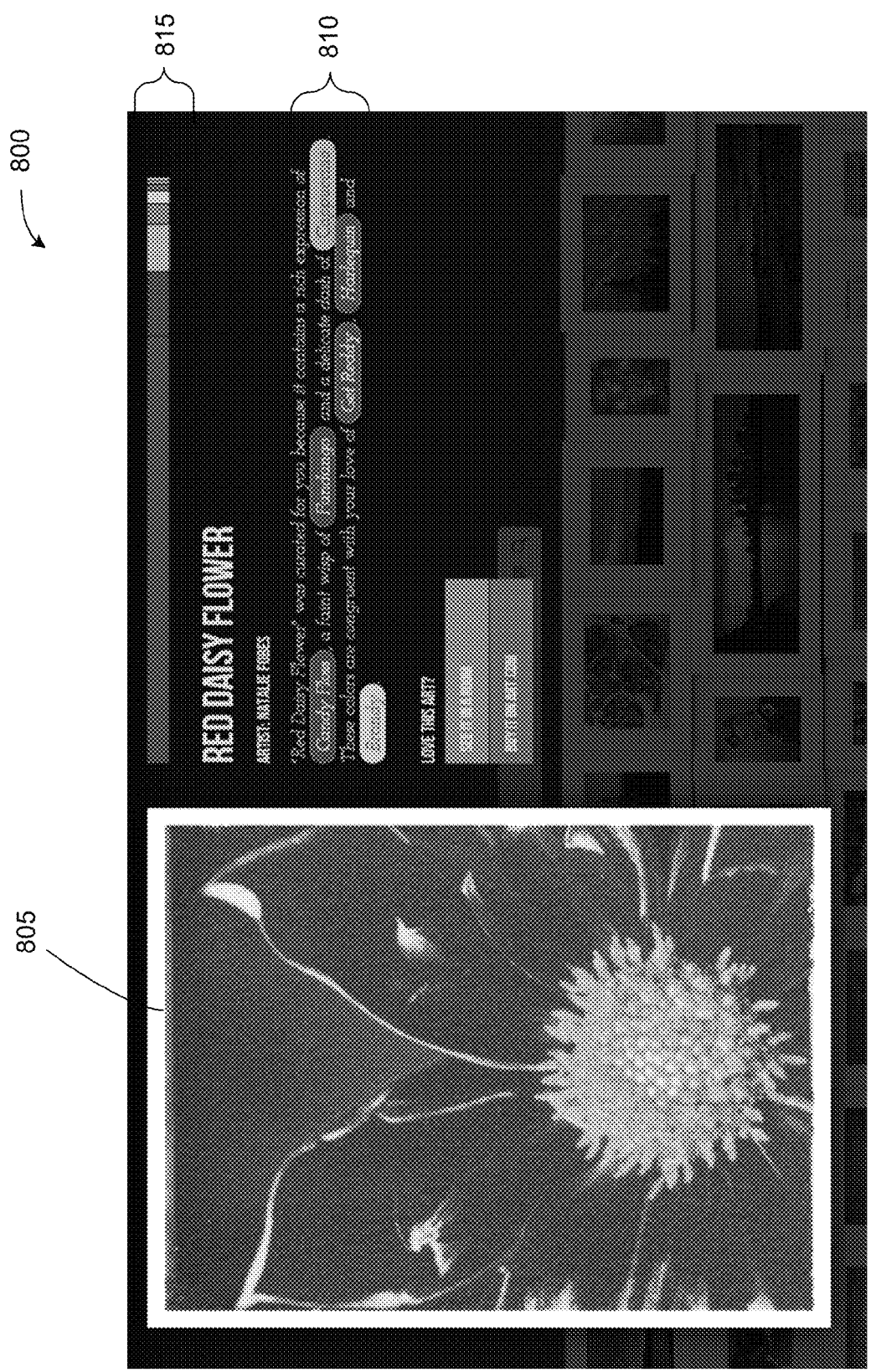
FIG. 8 is an example of art descriptor presented with an artwork, consistent with various embodiments.

Consider a scenario where the user 605 intends to obtain décor, such as artworks, based on a specific user-input color palette. The expert system 615 can find and present artworks that includes one or more colors in addition to or instead of the colors specified in the user-input color palette. In various embodiments, the expert system 615 may select such artworks because it may consider that the one or more colors harmonizes well with the specific user-input color palette. The presentation module 645 presents the art descriptor in association with the artworks. FIG. 8 is an example 800 of presenting an art descriptor 810 in association with an artwork 805, consistent with various embodiments. The art descriptor 810 can include a brief description such as a name of the artwork and artist. The art descriptor 810 can also include a reason for selection of the artwork 805, such as "Red Daisy Flower was curated for you because it contains a rich expression of Candy Floss, a faint wisp of Fandango and a delicate dash of Cappuccino." The art descriptor 810 can also include a reason for why the artwork 805 with the colors "Candy Floss," "Fandango" and "Cappuccino" was selected even though the user did not include those colors in the specific user-input color palette (not illustrated). The reason can be, for example, "These colors are congruent with your love of Get Reddy, Harlequin and Brandy" as illustrated in art descriptor 810.

In various embodiments, the presentation module 645 can also highlight the text indicative of the colors in the art descriptor 810. For example, a font or a background of a text indicative of a particular color may be presented in the particular color. In the example 800, the art descriptor 810 presents a text indicative of a particular color, e.g. "Candy Floss" with the "Candy Floss" color background. In various embodiments, the presentation module 645 can also present a color palette 815 of the artwork 805 in association with the artwork 805.

Referring back to FIG. 6, the system 600 can also generate recommendations regarding various possible arrangements of décor items in a décor. For example, the system 600 can generate recommendations regarding various arrangements of décor such as artworks based on one or more of features such as a color palette of the artworks, a frame type of the artworks, features of the artworks, a finish type, e.g. matte, glossy, etc. of the artworks, a genre, an artist, content of the artworks.

In various embodiments, the system 600 can also determine a text, that is a description e.g. magazines, online articles etc., representing the plurality of decors harmonized based on the décor style classifier. In some embodiments, the system 600 can also determine applications (e.g. online applications) for creating a plurality of decors harmonized based on the décor style classifier.

Figure 9A:
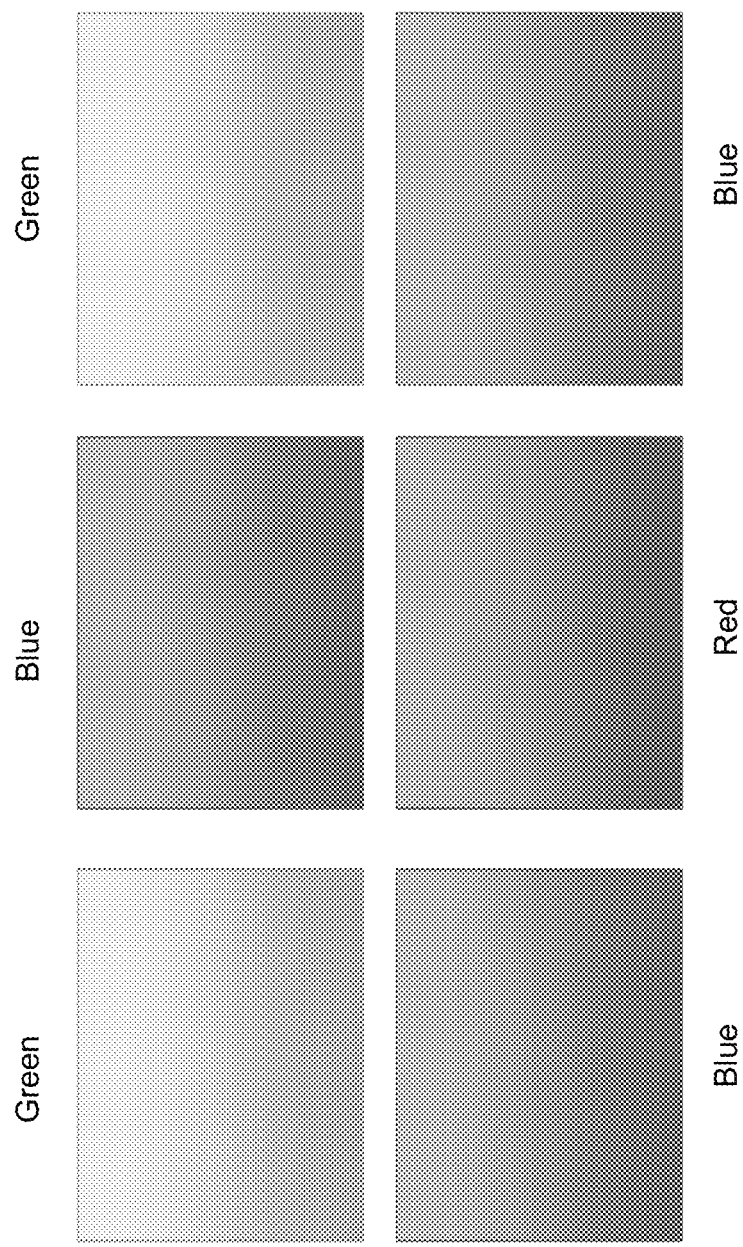
FIGS. 9A, 9B and 9C are collectively an example of arrangement of artworks based on décor styles, consistent with various embodiments.
Figure 9B:
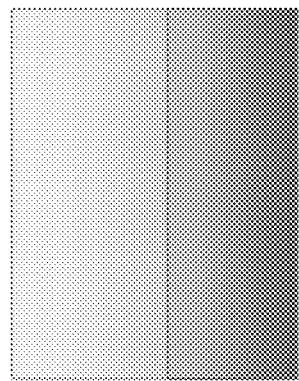
Figure 9B:
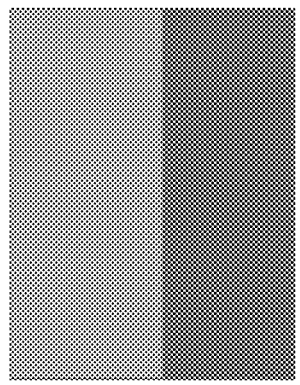
Figure 9B:
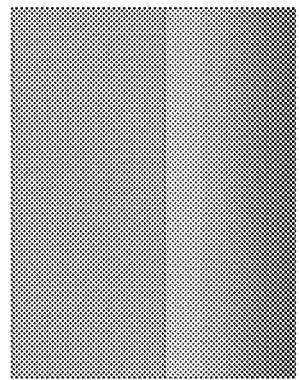
Figure 9B:
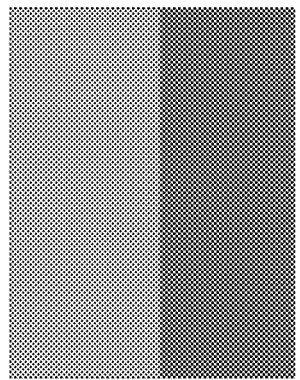
Figure 9B:
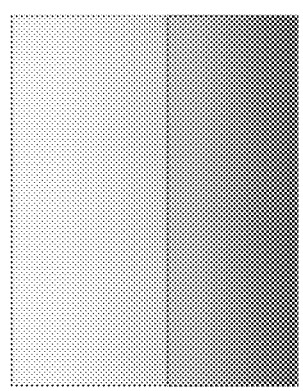
Figure 9B:
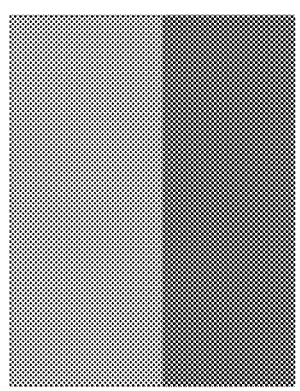
Figure 9C:
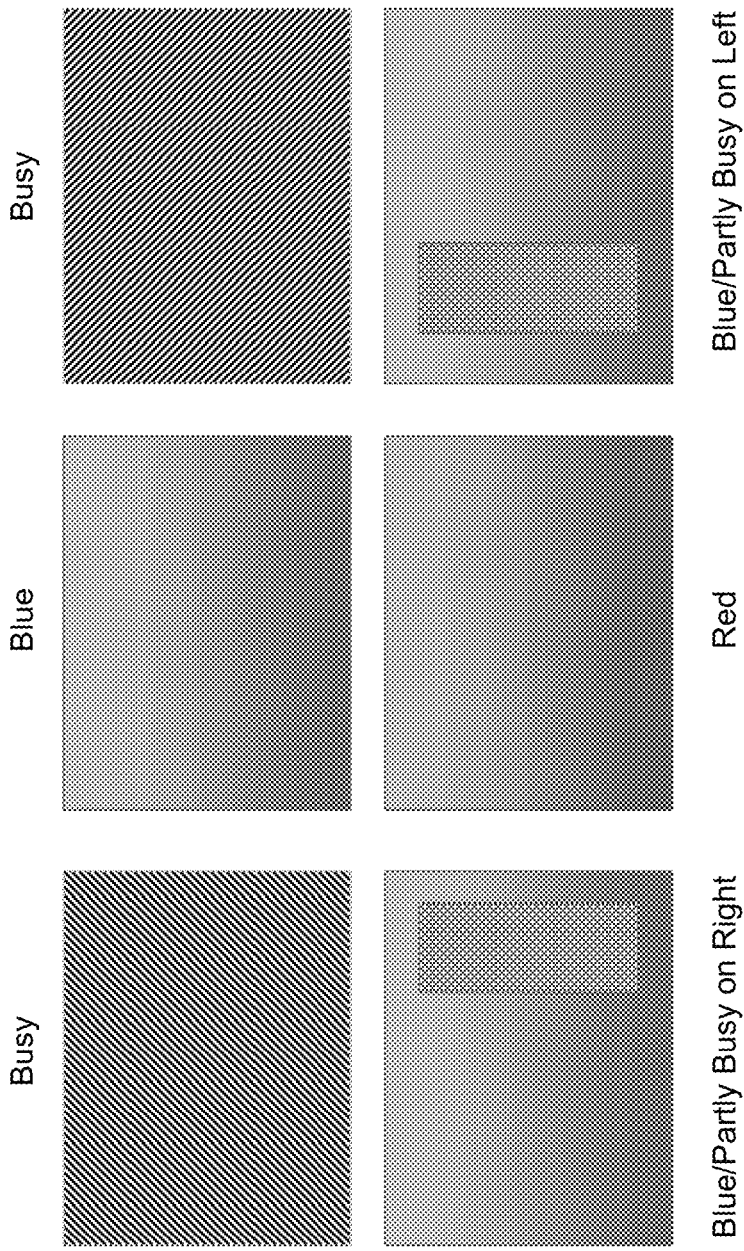

FIGS. 9A, 9B and 9C collectively is an example of various arrangements of a set of artworks, consistent with various embodiments. The various arrangements of the artworks are generated using a system such as system 600 of FIG. 6. The example arrangements 900, 950 and 975 of FIGS. 9A, 9B and 9C, respectively, illustrate arrangements of six artworks based on different criteria. The example of FIG. 9A, illustrates an arrangement 900 of six pieces of "abstract" style artwork with a color palette of green, blue and red predominantly distributed among the artworks. In various embodiments, one of the reasons for recommending various arrangements is to create an arrangement that is sophisticated or pleasing to the eye and in congruence with the décor style. The arrangement 900 is one such arrangement where the artworks are arranged in a specific way based on the color palette of the artworks. In the arrangement 900, in the first row, the artworks with predominantly green palette are alternated with a predominantly blue palette artwork, and in a second row, the artworks with predominantly blue palette are alternated with a predominantly red palette artwork. In various embodiments, the artworks may be arranged in various other patterns. Additionally or alternatively, the arrangement can also be based on a color pattern in the artwork, that is, a pattern of one or more colors in the artwork. Further, in various embodiments, the expert system 615 may provide improved recommendations of arrangements based on a user selection/input/feedback on prior recommendations.

The example of FIG. 9B illustrates an arrangement 950 of six pieces of artwork having a color palette distributed among green, blue and red. In the example of FIG. 9B, each of the artworks have an equal distribution of at least two colors. Further, a primary color, e.g. green, is in a top portion of all the artworks and secondary and tertiary colors, blue and red, are in bottom portions of three pieces of artworks each. The arrangement 950 includes, in the first row, artworks with shades of green in the top portion and blue in the bottom portion and, in the second row, artworks with green in the top portion and red in the bottom portion. In various embodiments, the system 600 may also consider a color of the frame, a finish type of the artwork, etc. in recommending various arrangements. In general, the images can be arranged according to their color, size and style to obtain an arrangement that is congruent with the user's taste and/or the décor style of the room.

In the example FIG. 9C, artworks are arranged based on features such as morphological features of the images. The example of FIG. 9C includes a combination of artworks that are considered either predominantly busy, partly busy, or not busy. For example, the first and third artworks in the first row of arrangement 975 can be considered to be of predominantly "busy" style. Similarly, the first artwork in the second row is considered to be partly busy on the right portion of the artwork, and the third artwork is considered to be partly busy on the left portion of the artwork. The arrangement 975 places, in the first row, the predominantly busy artworks separated by a not busy blue color palette artwork. In the second row, the arrangement 975 places the partly busy artworks separated by a not busy red color palette artwork. The arrangement 975 has placed the partly busy artworks in a symmetrical fashion, e.g. symmetrical on either sides of the red artwork. Various other combinations are possible. For example, the second row may be arranged as the first row or the partly busy artworks may be placed such that the busy portions are facing away from one another instead of towards each other.

In various embodiments, the recommendation of arrangement combinations can also consider factors such as a layout of the arrangement, e.g. landscape, portrait, a circular arrangement etc.; a dimension of the available space where the artworks are intended to be installed; a shape of the frame of the artworks; existing decor items, e.g. vases or soft furnishings of a certain pattern, design and color etc., already in a room where the artworks are intended to be installed.

In various embodiments, similar recommendation, including what décor items to buy in what color, pattern and design to create a particular décor arrangement, such as vases, rugs, cushions and art, can be provided. For example, the striped pattern of cushions could be deployed as a motif for the wall décor, in unison, contra-unison etc. with a particular décor style.

In some embodiments, the system 600 can also recommend fashion accessories and/or clothes based on a particular décor style specified by the user. For example, the user may want a recommendation of clothing accessories based on a particular style of a celebrity such as "Michael Jackson." The system 600 discovers various décor items such as hats, ties, shoes, glove etc. that users typically associate with Michael Jackson, that are endorsed, worn, are similar to that worn by Michael Jackson, etc. In another example, the system 600 can also provide recommendations of fashion accessories based on a particular fashion designer, a particular color trend. In some embodiments, the system 600 can also recommend fashion accessories that match, complement, supplement, or contrast with a particular accessory input by the user (as an image and/or keywords describing the particular accessory) based on one or more of color, design pattern, size, designer of the particular color accessory etc.

Referring back to FIG. 6, in various embodiments, the system 600 can also present recommendations regarding service providers who can facilitate creating the decors discovered by the system 600 and/or merchants where the decors are available for purchase. The service providers or the merchants can include clothing designers, jewelers, interior decorators, architects, décor experts, websites that include information on décor styles, online applications that can help create décor based on the décor styles etc. In various embodiments, the service providers or the merchants can have affiliation with a provider of system 600 to facilitate selling of their services or products associated with décor.

Figure 10:
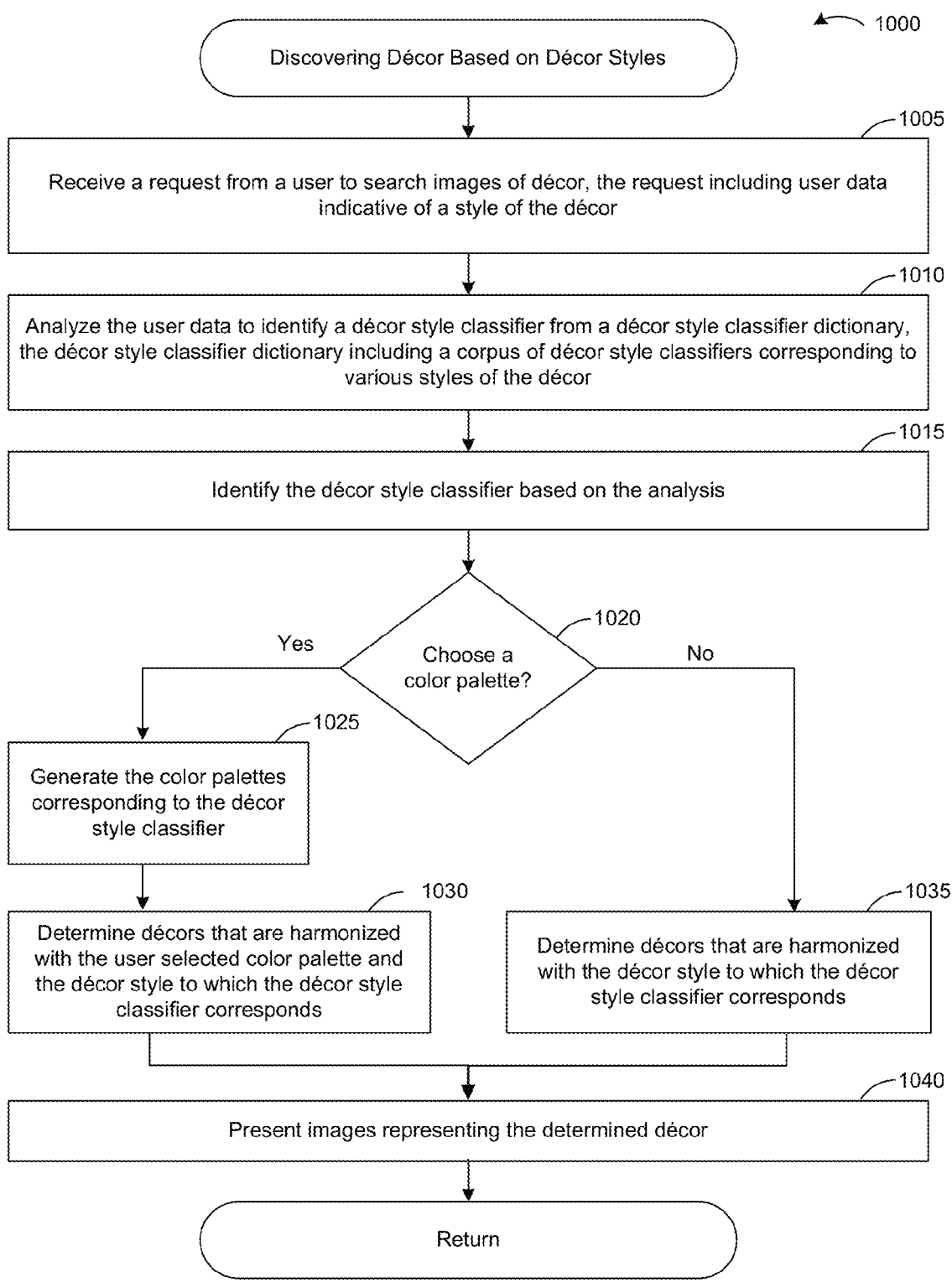
FIG. 10 is a flow diagram of a process for discovering décor based on décor styles, consistent with various embodiments.

FIG. 10 is a flow diagram of a process for discovering décor based on décor styles, consistent with various embodiments. In various embodiments, the process 1000 may be executed in a system such as system 600 of FIG. 6. At step 1005, the décor request receiving module 610 receives a request to search for images of décor based on a particular décor style input by a user. In various embodiments, the user input of décor style could be in the form of free text, user selection of images, user selection of predefined décor styles, including tastes of well-known designers etc. For example, the user may want to decorate their room according to the style and tastes of an expert (or a celebrity) whose style and taste can be analyzed using the methods already described above. In various embodiments, the styles of users such as experts, celebrities can be created as separate décor styles using the methods described above or the décor styles in the décor style classifier dictionary that match with the styles of the users or celebrities can be tagged with certain stylists, designers etc.

At step 1010, the expert system 615 analyzes the user input and performs a lookup in a décor style classifier dictionary database 620 to identify a décor style classifier that corresponds to the décor style input by the user. The décor style classifier dictionary 620 includes a number of décor style classifiers that correspond to various décor styles. In various embodiments, the analysis of the user input can include comparing the keywords and/or features of images of the user input with the keywords and/or features in the décor style classifier dictionary to identify a matching décor style classifier. If the expert system 615 does not find a match, it may present a few keywords from the décor style classifier dictionary that is probably relevant to or is semantically similar to the keywords of the user input to the user. The user may then select one or more of the presented keywords.

At step 1015, the expert system 615 identifies the décor style classifier based on the analysis of step 1010. At step 1020, the expert system 615 determines whether the décor request receiving module 610 indicated that a user wants to choose a color palette. At step 1025, responsive to a determination that the user wants to choose a color palette, the expert system 615 generates a number of color palettes corresponding to the décor style classifier, e.g. based on the colors included in the signature of the décor style classifier for selection by the user. At step 1030, the expert system 615 determines various decors that are harmonized with the user selected color palette and the décor style to which the décor style classifier corresponds. In an embodiment, the expert system 615 refers to the index of images, which is created based on the décor style classifiers, in the décor style classifier dictionary database 620 to obtain the location of images matching with the selected color palette and the décor style to which the décor style classifier corresponds. Then the expert system 615 can request the decor retrieving module 625 to obtain those images from the corresponding locations. At step 1040, the presentation module 645 presents the images of the harmonized décor.

Referring back to step 1020, if the expert system 615 determines that the user does not want to choose a color palette, at step 1035, the expert system 615 determines various decors that are harmonized with the décor style to which the décor style classifier corresponds. At step 1040, the presentation module 645 presents the images of the harmonized décor.

Figure 11:
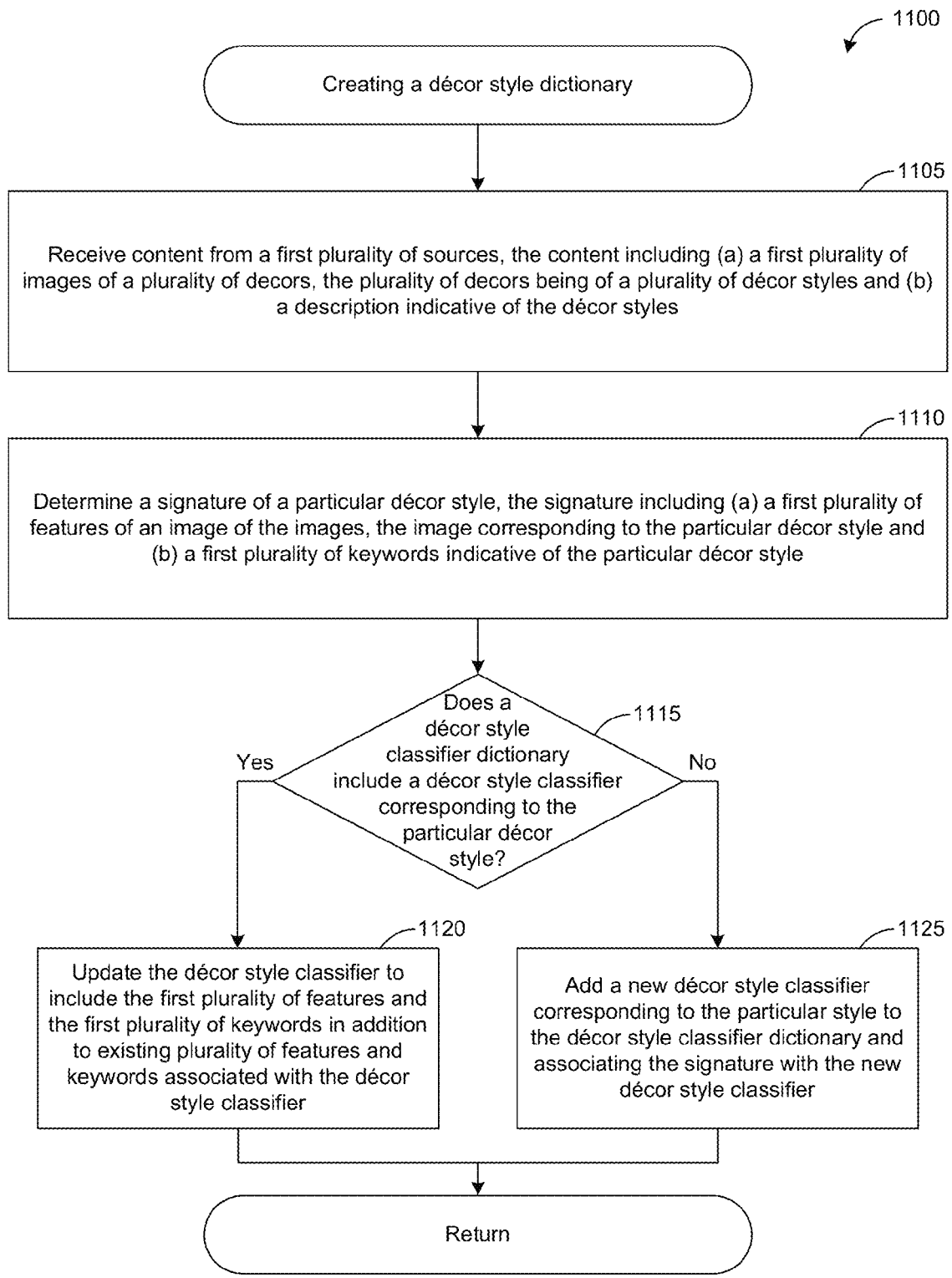
FIG. 11 is a flow diagram of a process for creating a décor style dictionary, consistent with various embodiments.

FIG. 11 is a flow diagram of a process for creating a décor style dictionary, consistent with various embodiments. In various embodiments, the process 1100 may be executed in a system such as system 200 of FIG. 2. At step 1105, the data gathering module 205, obtains content such as a number of images and description indicative of various décor styles from a number of sources. At step 1110, the style analysis module 210 determines a signature of a particular décor style which includes a number of features of an image and keywords indicative of the particular décor style. At step 1115, the style dictionary creation module 215, determines whether the décor style dictionary includes a décor style classifier corresponding to the particular décor style. If the décor style dictionary includes a décor style classifier corresponding to the particular décor style, at step 1120, the style dictionary creation module 215 updates the décor style classifier to include the features and the keywords in addition to existing features and keywords associated with the décor style classifier.

On the other hand, if the décor style dictionary does not include a décor style classifier corresponding to the particular décor style, at step 1125 the style dictionary creation module 215 adds a new décor style classifier corresponding to the particular style to the décor style classifier dictionary and associates the signature of the particular décor style with the new décor style classifier.

Figure 12:
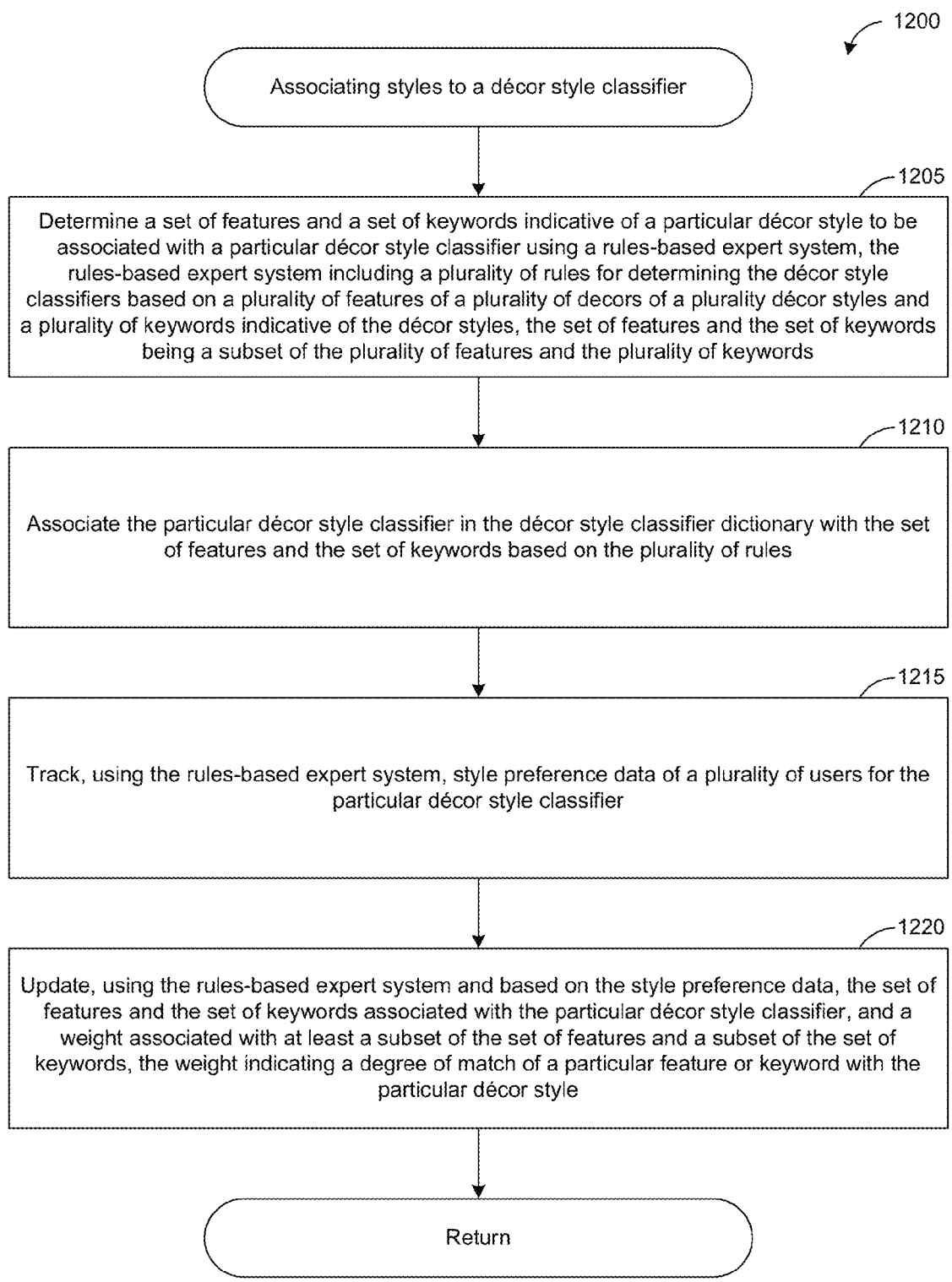
FIG. 12 is a flow diagram of a process for associating décor styles to a décor style classifier, consistent with various embodiments.

FIG. 12 is a flow diagram of a process for associating décor styles to a décor style classifier, consistent with various embodiments. In various embodiments, the process 1200 may be executed in a system such as system 200 of FIG. 2. At step 1205, the recommendation engine 220 (also referred as expert system 220) determines a set of features and a set of keywords indicative of a particular décor style to be associated with a particular décor style classifier. In various embodiments, the expert system 220 is a rules-based expert system. The expert system 220 includes data regarding the décor style classifiers and a number of features and keywords associated with each of the décor style classifiers, as a number of rules.

At step 1210, the expert system 220 associates a particular décor style classifier in the décor style classifier dictionary with the set of features and the set of keywords determined based on the rules. At step 1215, the expert system 220 tracks style preference data of a number of users for a décor style to which a particular décor style classifier corresponds. At step 1220, the expert system 220 updates the set of features and/or keywords associated with the particular décor style classifier based on the style preference data. Also, in various embodiments, the expert system 220 associates a weight with each of the set of features and keywords that indicates a degree of match of a particular feature or keyword with the particular décor style.

Figure 13:
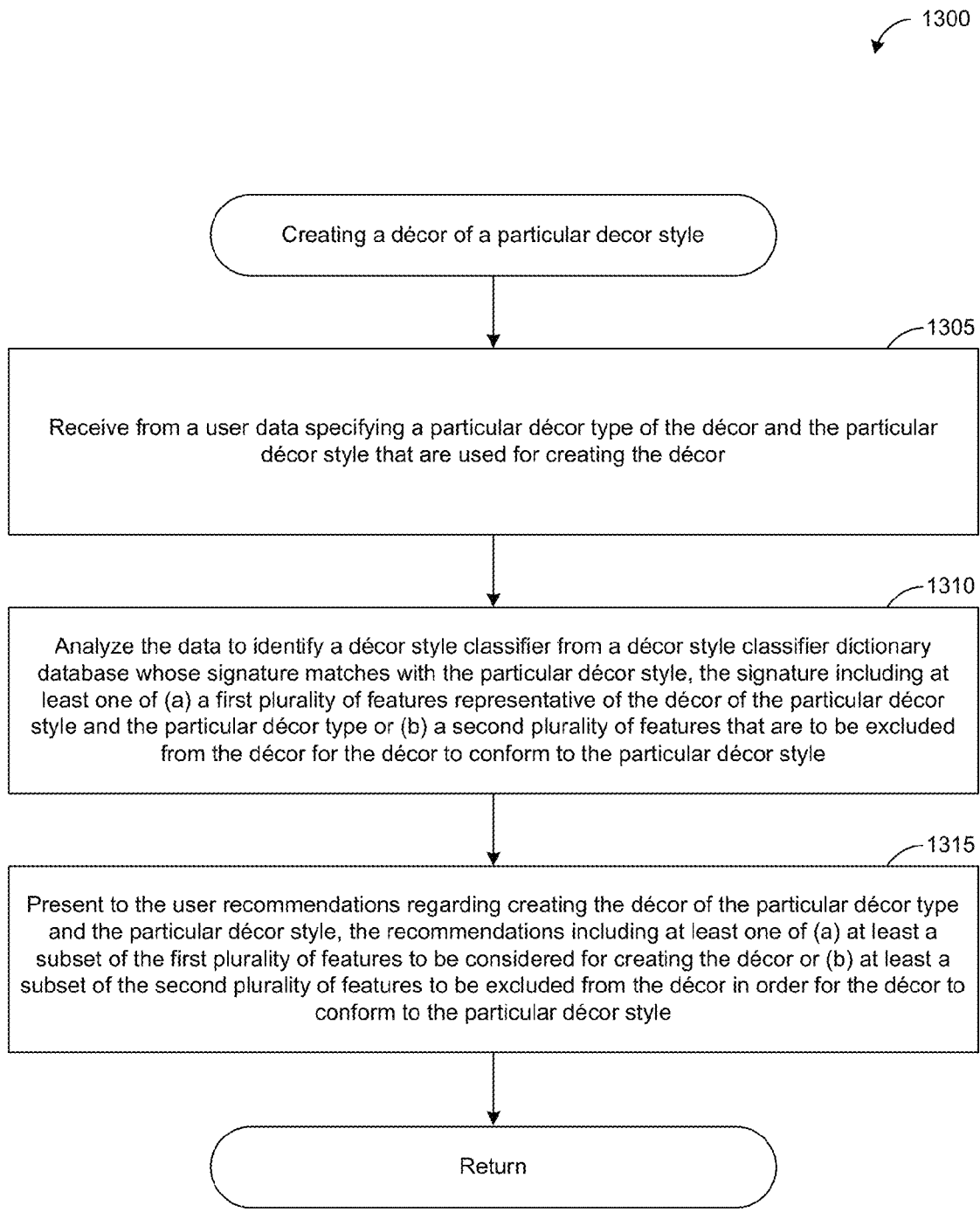
FIG. 13 is a flow diagram of a process for creating a décor of a particular décor style, consistent with various embodiments.

FIG. 13 is a flow diagram of a process for creating a décor of a particular décor style, consistent with various embodiments. In some embodiments, the process 1300 may be executed in association with a system such as system 600 of FIG. 6. At step 1305, the décor request receiving module 610 receives from a user data specifying a particular décor type and a particular décor style of the décor that the user is interested in creating. In some embodiments, the user can specify the data, including the particular décor style and type, using a set of keywords. For example, data specifying a particular décor type can include keywords "décor of a room," and the data specifying a particular décor style can include keywords "romantic." However, the user can input data in various other forms, including as a selection of predefined styles and/or décor types.

At step 1310, the expert system 615 analyzes the data to identify a décor style classifier from a décor style classifier dictionary database whose signature matches with the particular décor style. As described with reference to at least FIGS. 2 and 3, a signature of a décor style classifier can include a plurality of features representative of the décor of the particular décor style to which the décor style classifier corresponds. The signature can also include, e.g., as "exclusions," a plurality of features that are to be excluded from the décor in order for the décor to conform to the particular décor style.

At step 1315, presentation module 645 obtains the recommendations from the expert system 615 and presents the recommendations for creating the décor of the particular décor style and décor type to the user based on the signature of the décor style classifier. In some embodiments, the recommendations can include features representative of the décor of the particular décor style and the particular décor type to which the décor style classifier corresponds. As described above, the features of décor can include one or more of (a) décor items in the décor, (b) a placement of the décor items, (c) color pattern of the décor, (d) color of the décor items, or (e) design of the décor items, e.g. shape, form, material, pattern etc. In some embodiments, such features may be determined using morphological analysis of one or more images representing a plurality of decors of the particular décor style and the particular décor type.

Referring back to step 1315, in the example of creating a "décor of a room" with "romantic" style, the recommendations can include, "Consider including a bed in the shape of heart." It can also include "Consider having a white bed sheet made of silk or satin." It can also include "Consider having a number of candles by the bed." It can also include "Consider having a combination of artworks, including paintings, murals or sculptures depicting love." It can also include "Consider having vases with red roses." It can also include "Consider having vases that are of soft or light colors."

In some embodiments, the recommendations can also include a set of the features that the user can consider excluding from the décor in order for the décor to conform to the particular décor style. Continuing with the above example, the recommendation can include "Do not include a television set in the room." It can also include "Consider removing any bright or dark décor items." It can also include "Do not include any loud paintings."

Further, the recommendations can be presented as (a) images of décor created based on the recommendations and/or (b) a plurality of words describing each of the recommendations.

Figure 14:
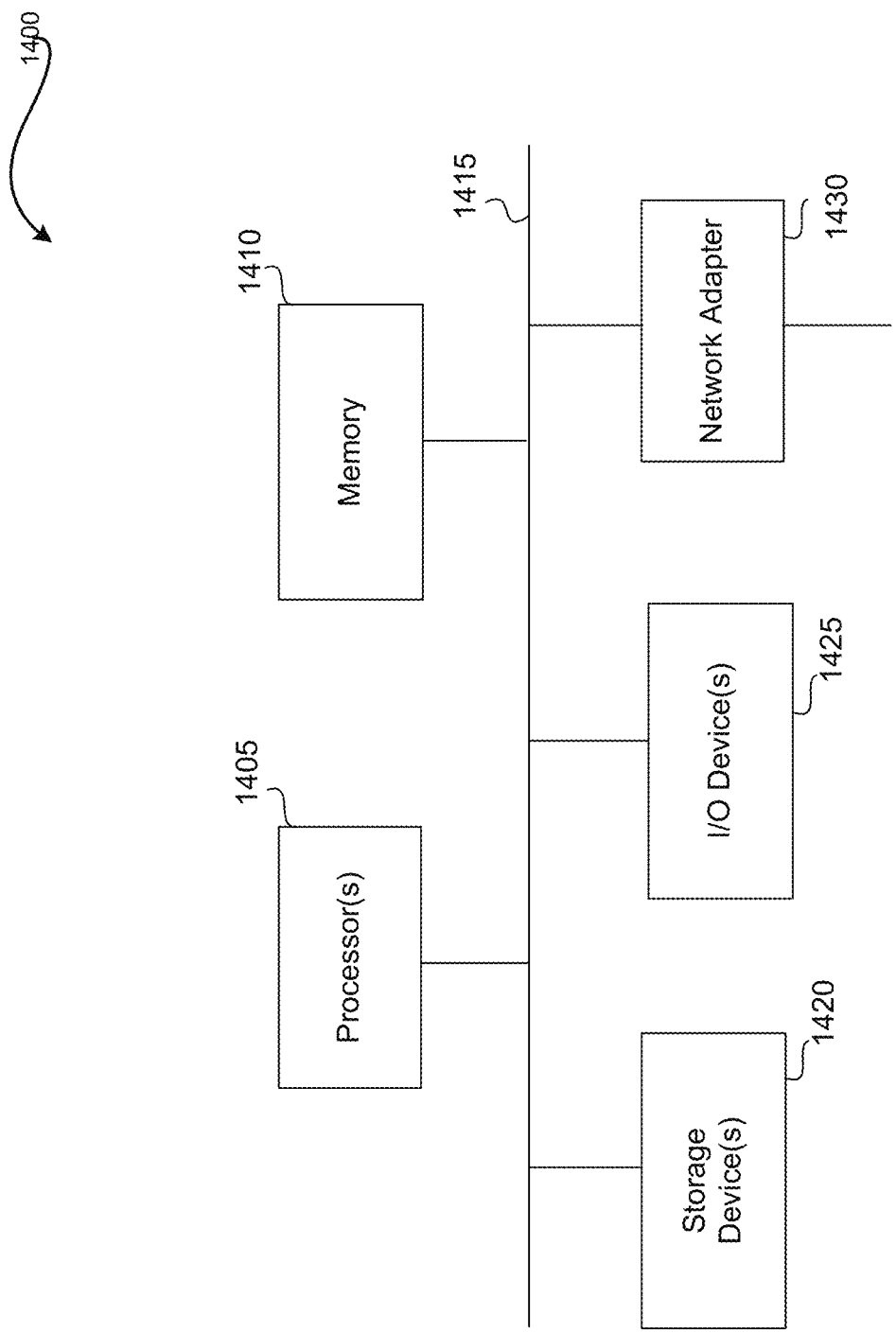
FIG. 14 is a block diagram illustrating components of an apparatus that may perform various operations described by the technology.

FIG. 14 is a block diagram of a computer system as may be used to implement features of some embodiments of the disclosed technology. The computing system 1400 may include one or more central processing units ("processors") 1405, memory 1410, input/output devices 1425 (e.g., keyboard and pointing devices, display devices), storage devices 1420 (e.g., disk drives), and network adapters 1430 (e.g., network interfaces) that are connected to an interconnect 1415. The interconnect 1415 is illustrated as an abstraction that represents any one or more separate physical buses, point to point connections, or both connected by appropriate bridges, adapters, or controllers. The interconnect 1415, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1410 and storage devices 1420 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 1410 can be implemented as software and/or firmware to program the processor(s) 1405 to carry out actions described above. In some embodiments, such software or firmware may be initially provided to the processing system 1400 by downloading it from a remote system through the computing system 1400 (e.g., via network adapter 1430).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the invention. For example, though the embodiments illustrate discovering décor such as artworks, décor of a room, the decor is not limited to artworks or décor of a room. The décor can include one or more of décor items such as paintings, pictures, artifacts, sound, architectural pieces, arrangement of artworks, color selection, rugs, mats, furnishings, clothes, jewelry, fashion, car interiors, flower arrangement, garden etc. Accordingly, the invention is not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A method for providing and managing a décor style classifier dictionary database, the method comprising:
　　receiving, at a computer system and from a first plurality of sources, a first plurality of images of a plurality of décors, the plurality of décors being of a plurality of décor styles;
　　receiving, at the computer system and from the first plurality of sources, a description indicative of the décor styles;
　　determining, by the computer system, a signature of a particular décor style of the plurality of décor styles based on analysis of the first plurality of images and the description, the determining the signature including:
　　　　determining a first plurality of features of an image of the first plurality of images, the image corresponding to the particular décor style, the first plurality of features including a design of décor items in the image, and
　　　　determining, using the description, a first plurality of keywords indicative of the particular décor style;
　　generating, by the computer system, a décor style classifier that is indicative of the particular décor style, the generating including associating the signature of the particular decor style with the décor style classifier, the décor style classifier to be used for determining décor items that match the particular décor style; and
　　storing the décor style classifier in a décor style classifier dictionary database, the décor style classifier dictionary database including a plurality of décor style classifiers corresponding to the décor styles.

2. The method of claim 1, wherein determining the first plurality of features of the image includes determining morphological features of the image.

3. The method of claim 1, wherein determining the first plurality of features of the image includes determining a color pattern of the image.

4. The method of claim 1, wherein determining the first plurality of keywords describing the particular décor style further includes:
　　determining additional keywords corresponding to a metadata of the image that describes the particular décor style, and
　　associating the additional keywords with the décor style classifier.

5. The method of claim 1, wherein determining the first plurality of keywords further includes:
　　determining, from a second plurality of sources, additional keywords that are semantically same as the first plurality of keywords, and
　　associating the additional keywords with the décor style classifier.

6. The method of claim 1 further comprising:
　　determining, using a recommendation engine, whether to associate the décor style classifier with a set of features and a set of keywords indicative of the particular décor style, and
　　associating the décor style classifier with the set of features and the set of keywords based on the recommendation engine.

7. The method of claim 6, wherein the recommendation engine includes a rules-based expert system, the rules-based expert system including:
　　a plurality of rules for determining the décor style classifiers based on a second plurality of features of a second plurality of images representing the plurality of décors of the plurality of décor styles and a second plurality of keywords indicative of the plurality of décor styles, the set of features and the set of keywords being a subset of the second plurality of features and the second plurality of keywords, respectively, and wherein the associating includes associating the décor style classifier with the set of features and the set of keywords based on the plurality of rules.

8. The method of claim 7, wherein associating the set of features and the set of keywords with the décor style classifier using the rules-based expert system further includes:

tracking, by the rules-based expert system, a style preference data of a plurality of users for the décor style classifier, and updating, by the rules-based expert system, the set of features and the set of keywords associated with the décor style classifier based on the style preference data, the updating including associating a weight with each feature of the set of features and each keyword of the set of keywords that indicates a degree of match of a particular feature or keyword with the particular décor style.

9. The method of claim 6, wherein the recommendation engine includes a clustering engine to:

create a first set of clusters based on a second plurality of features of a second plurality of images representing the plurality of décors of the plurality of décor styles, each cluster of the first set of clusters including a subset of the second plurality of features representing a specific décor style, create a second set of clusters based on a second plurality of keywords indicative of the plurality of décor styles, each cluster of the second set of clusters including a subset of the second plurality of keywords representing the specific décor style, associate a first cluster from the first set of clusters that has the set of features with the décor style classifier, and associate a second cluster from the second set of clusters that has the set of keywords with the décor style classifier.

10. The method of claim 1 further comprising:

indexing the first plurality of images and the first plurality of keywords based on the décor style classifiers they are associated with; and assigning style probabilities to the first plurality of images, the style probabilities indicating a probability of a particular image belonging to the décor styles corresponding to the décor style classifiers.

11. The method of claim 1 further comprising:

receiving, at the computer system and from a user, a user input including data indicative of a required décor style, the user input including at least one of a second image or a second plurality of keywords describing the required décor style;

analyzing, at the computer system, the user input to identify a target décor style classifier from the décor style classifier dictionary database that corresponds to at least one of the second image or the second plurality of keywords; and identifying the target décor style classifier based on the analysis.

12. The method of claim 11, wherein analyzing the user input includes at least one of (a) comparing the second plurality of keywords of the user input with the first plurality of keywords from the décor style classifier dictionary database or (b) comparing a plurality of features of the second image with the first plurality of features from the décor style classifier dictionary.

13. The method of claim 12, wherein the comparing the second plurality of keywords of the user input with the first plurality of keywords from the décor style classifier dictionary database includes:

determining whether there is match between the second plurality of keywords and the first plurality of keywords, responsive to a determination that there is no match, presenting, to the user, a subset of the first plurality of keywords from the décor style classifier dictionary database that is probably relevant to or is semantically similar to the second plurality of keywords of the user input, receiving a user selection of the subset of the first plurality of keywords, and identifying the décor style classifier corresponding to the user selection of the subset of the first plurality of keywords.

14. The method of claim 11 further comprising:

generating, in response to a request from the user to generate a plurality of color palettes corresponding to the target décor style classifier, the color palettes, wherein the color palettes is generated based on color patterns associated with the target décor style classifier.

15. The method of claim 1, wherein the décor style includes at least one of (a) a concept of the décor, (b) a category of the décor, or (c) a mood associated with décor.

16. A method comprising:

receiving, at a computer system, a request for generating a plurality of color palettes for a décor, the request including user data indicative of a décor style;

analyzing, by the computer system, the user data to identify a décor style classifier from a décor style classifier dictionary database containing a plurality of décor style classifiers corresponding to a plurality of décor styles, the décor style classifier corresponding to the décor style; and generating, by the computer system, the color palettes corresponding to the décor style classifier.

17. The method of claim 16, wherein the user data indicative of the decor style includes a plurality or keywords or phrases.

18. The method of claim 17, wherein analyzing the user data to identify the décor style classifier from a décor style classifier dictionary database includes:

comparing the keywords or phrases from the user data with a set of keywords or phrases in the décor style classifier dictionary database, and identifying the décor style classifier corresponding to the set of keywords or phrases in the décor style classifier dictionary database that match with the keywords or phrases from the user data.

19. The method of claim 18, wherein comparing the keywords or phrases from the user data with the set of keywords or phrases in the décor style classifier dictionary includes comparing the keywords or phrases from the user data with the set of keywords or phrases in the décor style classifier dictionary database semantically.

20. The method of claim 16, wherein identifying the décor style classifier from a décor style classifier dictionary includes creating the décor style classifier dictionary database, the creating including:

receiving, by the computer system, content from a first plurality of sources, the content including (a) a first plurality of images corresponding to a plurality of décors of the plurality of décor styles, and (b) a description indicative of the décor styles, determining, by the computer system, a signature of a particular décor style, the signature including (a) a first plurality of colors of an image of the images, the image corresponding to the particular décor style and (b) a first plurality of keywords indicative of the particular décor style, and adding a new décor style classifier corresponding to the particular décor style to the decor style classifier dictionary database and associating the signature with the new decor style classifier.

21. The method of claim 20, wherein adding the new décor style classifier includes:

determining whether the décor style classifier dictionary database includes the new decor style classifier, and responsive to the determination that the décor style classifier dictionary database includes the new décor style classifier, updating the new décor style classifier to include the first plurality of colors and the first plurality of keywords.

22. The method of claim 21 further comprising:

determining a set of colors to be associated with a particular décor style classifier using a rules-based expert system, the rules-based expert system including data regarding the décor style classifiers and a plurality of colors associated with each of the décor style classifiers as a plurality of rules, the set of colors indicative of a style of the décor corresponding to the particular décor style classifier, the set of colors being a subset of the plurality of colors; and associating the particular décor style classifier in the dictionary database with the set of colors based on the plurality of rules.

23. The method of claim 22, wherein associating the set of colors with the particular décor style classifier using the rules-based expert system further includes:

tracking, by the rules-based expert system, color preference data of a plurality of users for the particular décor style classifier, and updating, by the rules-based expert system, the set of colors associated with the particular décor style classifier based on the color preference data, the updating including associating a weight with each of the set of colors that indicates a degree of match of a particular color with the particular style.

24. A non-transitory computer-readable medium storing program instructions that, when executed by a processor, causes the processor to perform a method of: receiving, at a computer system, content from a first plurality of sources, the content including (a) a first plurality of images of a plurality of décors, the plurality of décors being of a plurality of décor styles, and (b) a description indicative of the decor styles;

determining, by the computer system, a signature of a particular décor style from the plurality of décor styles, the signature including (a) a first plurality of features of an image of the images, the image corresponding to the particular décor style, the first plurality of features including a design of décor items in the image, and (b) a first plurality of keywords indicative of the particular décor style; and generating, by the computer system, a décor style classifier in a décor style classifier dictionary database, the décor style classifier dictionary database including a plurality of décor style classifiers corresponding to the décor styles, the generating including associating the signature with the décor style classifier.

25. An apparatus for providing and managing a décor style classifier dictionary database, the apparatus comprising:

a processor;

a style dictionary creation module that works in co-operation with the processor to create a décor style dictionary database containing a plurality of décor style classifiers that correspond to a plurality of décor styles, each of the plurality of décor style classifiers associated with a signature defining a particular décor style of the plurality of décor styles;

a style analysis module that works in co-operation with the processor to determine the signature of the particular décor style, the signature including (a) a plurality of features of an image corresponding to the particular décor style, the plurality of features including a design of décor items in the image, and (b) a plurality of keywords indicative of the particular décor style; and an expert system that works in co-operation with the processor to track style preference data of a plurality of users for each of the décor style classifiers and associate a weight with each of the plurality of features and each of the plurality of keywords of each of the décor style classifiers, the weight indicating a degree of match of a particular feature or keyword with the particular décor style.

26. A method for creating a décor of a particular décor style, the method comprising:

receiving, at a computer system and from a user, data specifying a particular décor type of the décor and the particular décor style that are used for creating the décor;

analyzing, at the computer system, the data to identify a set of features or a set of keywords that are indicative of the particular décor style;

retrieving, from a décor style classifier dictionary database, a décor style classifier whose signature matches with the set of features or the set of keywords, the signature including at least one of (a) a first plurality of features representative of the décor of the particular décor style and the particular décor type, the first plurality of features including a design of décor items in the décor, or (b) a second plurality of features that are to be excluded from the décor for the décor to conform to the particular décor style, the décor style classifier dictionary database including a plurality of décor style classifiers corresponding to a plurality of décor styles; and generating, by the computer system, recommendations regarding creating the décor of the particular décor type and the particular décor style, the recommendations generated based on the décor style classifier, the recommendations including at least one of (a) at least a subset of the first plurality of features to be considered for creating the décor or (b) at least a subset of the second plurality of features to be excluded from the décor.

27. The method of claim 26, wherein the first plurality of features includes at least one of décor items in the décor, a placement of the décor items, color pattern of the décor, or color of the décor items.

28. The method of claim 27, wherein the first plurality of features are determined using morphological analysis of one or more images representing a plurality of decors of the particular décor style and the particular décor type.

29. The method of claim 26, wherein the particular décor type includes at least one of (a) home décor, (b) fashion, (c) artworks, (d) paintings, (e) clothes, (f) jewelry, (g) car interiors, or (h) flower arrangement.

30. The method of claim 26, wherein the recommendations are presented as at least one of (a) a plurality of images, each of the images representative of the decor based on one of the recommendations or (b) a plurality of words describing each of the recommendations.

31. The method of claim 1, wherein the first plurality of sources includes any of a website, a journal, a blog, a document, or a magazine that includes content relevant to the décor styles.

\* \* \* \* \*